United States Patent
Yamamoto et al.

(10) Patent No.: US 9,595,834 B2
(45) Date of Patent: Mar. 14, 2017

(54) WIRELESS POWER TRANSMISSION SYSTEM AND POWER TRANSMISSION DEVICE

(71) Applicant: Panasonic Intellectual Property Management Co., Ltd., Osaka (JP)

(72) Inventors: Hiroshi Yamamoto, Osaka (JP); Kenichi Asanuma, Kyoto (JP); Tsutomu Sakata, Osaka (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 14/711,788

(22) Filed: May 14, 2015

(65) Prior Publication Data
US 2015/0349541 A1 Dec. 3, 2015

(30) Foreign Application Priority Data
May 27, 2014 (JP) .................................. 2014-108817

(51) Int. Cl.
H02J 5/00 (2016.01)
G01V 3/10 (2006.01)
H02J 17/00 (2006.01)

(52) U.S. Cl.
CPC ................ *H02J 5/005* (2013.01); *G01V 3/10* (2013.01); *H02J 17/00* (2013.01)

(58) Field of Classification Search
CPC . H02J 7/025; H02J 5/005; H02J 17/00; B60L 11/182; Y02T 10/7005
(Continued)

(56) References Cited

U.S. PATENT DOCUMENTS

| 2009/0001932 A1 | 1/2009 | Kamijo et al. |
| 2010/0066176 A1 | 3/2010 | Azancot et al. |

(Continued)

FOREIGN PATENT DOCUMENTS

| JP | 2009-011129 | 1/2009 |
| JP | 2009-033782 | 2/2009 |

(Continued)

OTHER PUBLICATIONS

The Extended European Search Report dated Nov. 3, 2015 for the related European Patent Application No. 15168502.1.
(Continued)

*Primary Examiner* — Thienvu Tran
*Assistant Examiner* — David M Stables
(74) *Attorney, Agent, or Firm* — Greenblum & Bernstein, P.L.C.

(57) ABSTRACT

In a first power transmission period, a power transmission device holds, in a memory, a value indicating a frequency f0 corresponding to an actual voltage value that matches a requested voltage value, then causes first AC power to be transmitted by using the frequency f0, and uses a foreign substance detector to determine whether or not a foreign substance is present. When it is determined that no foreign substance is present, in a second power transmission period, the power transmission device causes the power transmission of the first AC power to be resumed by using the value indicating the frequency f0, the value being held in the memory.

14 Claims, 16 Drawing Sheets

(58) Field of Classification Search
USPC .......................... 307/104; 320/108, 137, 162
See application file for complete search history.

(56) References Cited

U.S. PATENT DOCUMENTS

| | | |
|---|---|---|
| 2012/0001493 A1 | 1/2012 | Kudo et al. |
| 2015/0091510 A1* | 4/2015 | Iwawaki ................. H02J 7/025 |
| | | 320/108 |
| 2015/0162752 A1 | 6/2015 | Endo |

FOREIGN PATENT DOCUMENTS

| | | | |
|---|---|---|---|
| JP | 2012-016171 | 1/2012 | |
| JP | WO 2013136464 A1 * | 9/2013 | .............. H02J 7/025 |
| WO | 2013/136464 | 9/2013 | |
| WO | 2013/179394 | 12/2013 | |

OTHER PUBLICATIONS

The Extended European Search Report dated Nov. 4, 2015 for the related European Patent Application No. 15165892.9.

* cited by examiner f = f10 (< fr): ODD MODE f = f20 (> fr): EVEN MODE

WIRELESS POWER TRANSMISSION SYSTEM AND POWER TRANSMISSION DEVICE

BACKGROUND

1. Technical Field

The present disclosure relates to a wireless power-transmission system having a function for detecting a foreign substance (also referred to as "a foreign object") between coils and to a power transmission apparatus in the wireless power-transmission system.

2. Description of the Related Art

In recent years, electronic equipment and electric vehicle (EV) equipment, such as mobile phones and electric vehicles, that involve movement have come into widespread use. Wireless power-transmission systems for such equipment are being developed. In the wireless power transmission technology, an electromagnetic induction scheme, a magnetic-field resonance scheme (a resonance magnetic-field coupling scheme), an electric-field coupling scheme, and so on are known.

Wireless power-transmission systems based on an electromagnetic induction scheme and a magnetic-field resonance scheme include a power transmission apparatus having a power-transmitting coil and a power receiving apparatus having a power-receiving coil. A magnetic field generated by the power-transmitting coil is complemented by the power-receiving coil, so that power can be transmitted without direct contact of an electrode. One example of such wireless power-transmission systems is disclosed in Japanese Unexamined Patent Application Publication No. 2009-11129 (Patent Document 1).

In such related art, however, there are demands for a power transmission apparatus that performs highly efficient power transmission.

SUMMARY

In one general aspect, the techniques disclosed here feature a power transmission apparatus (device) that transmits first alternating-current (AC) power in a noncontact manner to a first resonator of a power receiving apparatus (device) including a power receiving circuit, the first resonator receiving the first AC power, the power receiving circuit converting the first AC power received by the first resonator to first direct-current (DC) power and supplying the first DC power to a load, the power transmission device comprising:

a memory that stores a requested voltage value of the first DC power supplied to the load;

a receiving circuit that receives, from the power receiving device, an actual voltage value of the first DC power supplied to the load;

an inverter circuit that generates and transmits the first AC power to the first resonator via a second resonator;

an oscillator circuit that generates second AC power smaller than the first AC power and transmits the second AC power to the first resonator via a third resonator;

a foreign substance detector that determines whether or not a foreign substance is present between the first resonator and the third resonator based on a physical quantity in the third resonator that changes according to the second AC power; and a power-transmission control circuit operative to:

set a foreign substance detection period in which foreign substance is detected by the foreign substance detector, between i) a first power transmission period in which the first AC power is transmitted from the second resonator to the first resonator and ii) a second power transmission period subsequent to the first power transmission period;

set sequentially to the inverter, in the first power transmission period, frequencies i) from a frequency f1 of a power transmission voltage in an initial state ii) to a frequency f2 of the requested voltage;

cause the inverter to transmit the first AC power at each of the set frequencies;

compare the requested voltage value with the actual voltage value of each of the frequencies, received by the receiving circuit;

store a value indicating a frequency f0 of the actual voltage value in the memory if the actual voltage value equals to the requested voltage value;

cause the inverter to transmit the first AC power at the frequency f0 if the actual voltage value equals to the requested voltage value;

cause the inverter to stop the first AC power temporarily after the elapse of a predetermined period of time;

cause the foreign substance detector to determine whether or not the foreign substance is present in the foreign substance detection period; and cause the inverter to resume a transmission of the first AC power in the second power transmission period by the value indicating the frequency f0 in the memory if it is determined that the foreign substance is not present within a predetermined period that starts from the stopping of the first AC power and that is regulated to cause the inverter to resume a transmission of the first AC power from the frequency f1.

According to one aspect of the present disclosure, it is possible to provide a power transmission apparatus that performs highly efficient power transmission.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Knowledge Underlying Present Disclosure

Figure 1:
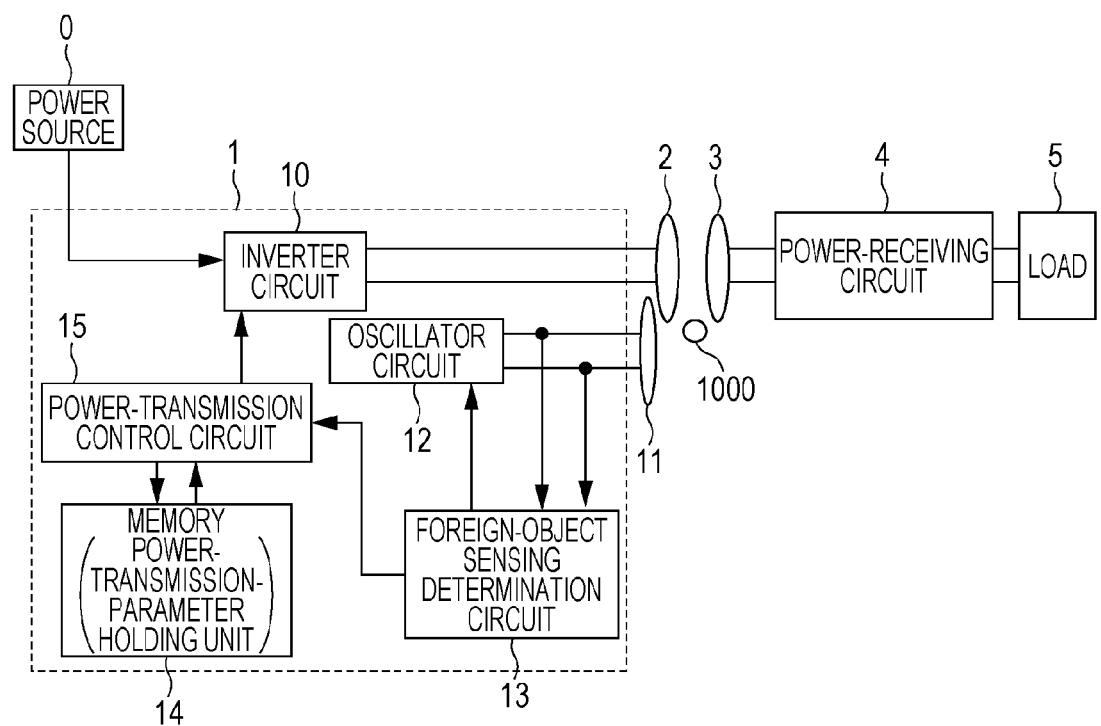
FIG. 1 is a diagram illustrating the configuration of a wireless power-transmission system according to a first embodiment of the present disclosure.

The present inventors have found that problems arise with the power transmission apparatus in the wireless power-transmission system described under the heading "BACKGROUND".

The definition of a "foreign substance" will be described first. In the present disclosure, the term "foreign substance" refers to an substance, such as metal or the human body (animal), that generates heat due to power transmitted between an electric-power-transmitting coil and an electric-power-receiving coil in a wireless electric-power transmission system, when the substance is present in the vicinity of the electric-power-receiving coil or the electric-power-transmitting coil.

The operation of a power transmission apparatus will be described next. First, when the power switch of the power transmission apparatus is turned on, the power transmission apparatus aligns the position of the power transmission apparatus and the position of a power receiving apparatus. When the position alignment of the power transmission apparatus and the power receiving apparatus is completed, foreign-substance sensing is performed to determine whether or not a foreign substance is present between the power transmission apparatus and the power receiving apparatus. When it is determined that no foreign substance is present between the power transmission apparatus and the power receiving apparatus, AC power is transmitted from the power transmission apparatus to the power receiving apparatus in a contactless manner.

For example, in the case of a power transmission apparatus installed in an armrest portion or the like in a vehicle, there are cases in which, while driving, a foreign substance enters between the power transmission apparatus and a power receiving apparatus during power transmission. In such cases, eddy current occurs in the foreign substance, which may cause overheating of the foreign substance.

In Japanese Unexamined Patent Application Publication No. 2009-33782 (Patent Document 2), a power-transmitting coil and a power-receiving coil are used, and before power transmission is started, a foreign substance is detected using a frequency different from a power-transmission frequency. Patent Document 2 further discloses periodically detecting a foreign substance by using the same frequency as the power-transmission frequency, while transmitting power. However, in Patent Document 2, changes in the amplitude of a voltage, the changes being caused according to whether or not a foreign substance is present, are small relative to changes in the amplitude of the voltage of the power to be transmitted, the changes being caused by changes in load which occur during the power transmission. Consequently, there is a problem in that an appropriate signal-to-noise (SN) ratio is not achieved, making it difficult to perform foreign substance detection with high accuracy.

Hence, to perform the foreign substance detection with high accuracy, it is necessary to temporarily stop the power transmission in order to eliminate an influence due to changes in power to be transmitted.

Accordingly, in order to prevent overheating of a foreign substance, the present inventors have considered repeating, after the power transmission apparatus starts power transmission, a foreign-substance sensing period in which foreign-substance sensing is performed and a power transmission period in which power transmission is performed and performing monitoring so that no foreign substance is overheated.

The Qi standard in the Wireless Power Consortium (WPC) discloses a specification described below, when power transmission is temporarily stopped and then the power transmission is resumed.

That is, when the power transmission is temporarily stopped, there are cases in which the power transmission is not resumed for some reason, even when a predetermined time (e.g., 350 ms) is exceeded. The Qi standard specifies that, in such cases, when the power transmission is resumed from the point of view of safety, the voltage is temporarily returned to a power transmission voltage (e.g., 2 V) in the initial state in which the power transmission was started for the first time and is then increased to a voltage (e.g., 5 V) requested by the power receiving apparatus. In the case of the Qi standard, a specific method for resuming the power transmission is a method in which frequencies from a frequency fH corresponding to the power transmission voltage (e.g., 2 V) in the initial state to a low frequency fL corresponding to the requested voltage are sequentially set to increase the voltage to the requested voltage (e.g., 5 V).

The Qi standard does not have any specification regarding a case in which the power transmission is resumed within the predetermined time after the power transmission is temporarily stopped. The Qi standard also does not have any specification regarding detecting a foreign substance after the power transmission is temporarily stopped.

During measurement of the power transmission voltage in this case, for example, the actual voltage of DC power output by a power-receiving circuit in the power receiving apparatus is measured.

To determine that the power transmission is temporarily stopped and to determine that the power transmission is resumed, the power receiving apparatus uses a method in which it measures the actual voltage of DC power output by the power-receiving circuit and determines whether or not the value of the measured actual voltage exceeds a predetermined threshold. The threshold in this case is set to, for example, 80% of the value of the requested voltage. For example, when the requested voltage is 5 V, the threshold is 4 V, which is 80% of 5 V.

The period of time from when the power transmission is temporarily stopped until the power transmission is resumed is hereinafter referred to as "power-transmission stopping time".

As described above, the present inventors have considered repeating, after starting the power transmission, the foreign-substance sensing period in which the foreign-substance sensing is performed and the power transmission period in which the power transmission is performed. For example, the present inventors have considered the following. After starting the power transmission, a power transmission apparatus installed in a vehicle repeats the foreign-substance sensing period in which the foreign-substance sensing is performed and the power transmission period in which the power transmission is performed and performs monitoring so that no foreign substance is overheated. In this case, in the foreign-substance sensing period, the power transmission apparatus temporarily stops the power transmission and determines whether or not a foreign substance is present between the first resonator and the third resonator. Upon determining in the foreign-substance sensing period that no foreign substance is present, the power transmission apparatus resumes the power transmission.

As described above, the Qi standard requests that, when the power transmission is temporarily stopped and then the power transmission is not resumed even if the predetermined time is exceeded, the voltage be temporarily returned to the power transmission voltage in the initial state and then be increased to the voltage requested by the power receiving apparatus.

However, for example, when the power transmission is temporarily stopped and then a foreign substance is sensed, there are cases in which the power-transmission stopping time does not exceed the predetermined time (e.g., 350 ms).

A method for resuming the power transmission in such cases is not specified in the Qi standard, as described above.

In such cases, a program for realizing the Qi standard needs to be incorporated into an apparatus. Thus, applying the idea of the Qi standard to foreign-substance sensing and using a method in which the power transmission is temporarily stopped to perform the foreign-substance sensing and then the voltage is temporarily returned to the power-transmission voltage in the initial state and is then increased to the voltage requested by the power receiving apparatus is thought to lead to an increase in the efficiency of development and a reduction in cost.

However, the use of the above-described method involves, after the foreign-substance sensing period, a large amount of time for the voltage to reach from the power transmission voltage in the initial state to the requested voltage, thereby increasing the power-transmission stopping time.

Thus, the present inventors have found that the ratio of the power-transmission stopping time to a power transmission time in which power transmission is performed increases, and the power transmission efficiency of the power transmission apparatus decreases, thus causing a problem that highly efficient power transmission cannot be performed.

Also, similarly to the Qi standard, another standard also specifies a technique in which, when power transmission is temporarily stopped and then the power transmission is resumed, the voltage is temporarily returned to a power transmission voltage in the initial state in which the power transmission was started for the first time and is then increased to a voltage requested by a power receiving apparatus. However, there is no particular specification about a method for setting the power transmission voltage in the initial state, and it may be set using a frequency lower than the aforementioned low frequency fL (i.e., a frequency lower than the resonant frequency of the power-transmitting coil and the power-receiving coil) or the like.

Similarly to the Qi standard, the other standard does not have any specification regarding a case in which the power transmission is temporarily stopped and is then started within the aforementioned predetermined time. The other standard also does not have any specification for sensing a foreign substance after the power transmission is temporarily stopped.

Accordingly, it is desired to provide a power transmission apparatus that reduces the power-transmission stopping time and that performs highly efficient power transmission.

In view of the above-described consideration, the present inventors have conceived aspects disclosed hereinafter.

According to a power transmission device of one aspect of the present disclosure, the power transmission device transmits first AC power in a noncontact manner to a first resonator of a power receiving device including a power receiving circuit, the first resonator receiving the first AC power, the power receiving circuit converting the first AC power received by the first resonator to first DC power and supplying the first DC power to a load.

The power transmission device comprising:

a memory that stores a requested voltage value of the first DC power supplied to the load;

a receiving circuit that receives, from the power receiving device, an actual voltage value of the first DC power supplied to the load;

an inverter that generates and transmits the first AC power to the first resonator via a second resonator;

an oscillator that generates second AC power smaller than the first AC power and transmits the second AC power to the first resonator via a third resonator;

a foreign substance detector that determines whether or not a foreign substance is present between the first resonator and the third resonator based on a physical quantity in the third resonator that changes according to the second AC power; and power transmission control circuitry operative to:

set a foreign substance detection period in which foreign substance is detected by the foreign substance detector, between i) a first power transmission period in which the first AC power is transmitted from the second resonator to the first resonator and ii) a second power transmission period subsequent to the first power transmission period;

set sequentially to the inverter, in the first power transmission period, frequencies i) from a frequency f1 of a power transmission voltage in an initial state ii) to a frequency f2 of the requested voltage;

cause the inverter to transmit the first AC power at each of the set frequencies;

compare the requested voltage value with the actual voltage value of each of the frequencies, received by the receiving circuit;

store a value indicating a frequency f0 of the actual voltage value in the memory if the actual voltage value equals to the requested voltage value;

cause the inverter to transmit the first AC power at the frequency f0 if the actual voltage value equals to the requested voltage value;

cause the inverter to stop the first AC power temporarily after the elapse of a predetermined period of time;

cause the foreign substance detector to determine whether or not the foreign substance is present in the foreign substance detection period; and cause the inverter to resume a transmission of the first AC power in the second power transmission period by the value indicating the frequency f0 in the memory if it is determined that the foreign substance is not present within a predetermined period that starts from the stopping of the first AC power and that is regulated to cause the inverter to resume a transmission of the first AC power from the frequency f1.

According to this aspect, the power transmission is temporarily stopped, and in the foreign-substance sensing period, the foreign substance detector is used to determine whether or not a foreign substance is present, and when it is determined that no foreign substance is present within a predetermined time for which the power transmission being to be resumed at the frequency f1 is specified and that starts from the stopping of the power transmission, the power transmission of the first AC power is resumed in the second power transmission period by using the value indicating the frequency f0, the value being held in the memory.

With this arrangement, through use of the value indicating the frequency f0, the value being held in the memory, the voltage is not returned to the power transmission voltage in the initial state. Thus, it is possible to reduce the period of time until the voltage reaches from the power transmission voltage in the initial state to the requested voltage. Hence, it is possible to provide a power transmission apparatus that performs highly efficient power transmission by reducing the power-transmission stopping time from when the power transmission is temporarily stopped until the power transmission is resumed.

An overview of embodiments of the present disclosure will be described below.

Illustrative embodiments of the present disclosure will be described below with reference to the accompanying drawings. The present disclosure is not limited to the embodiments described below. A new embodiment may also be created by making various modifications to each embodiment or by combining some of the embodiments. In the following description, the same or similar constituent elements are denoted by the same reference numerals.

First Embodiment

FIG. 1 is a diagram illustrating an overview of the configuration of a wireless power-transmission system according to a first embodiment of the present disclosure. This wireless power-transmission system includes a power-transmitting circuit 1, a power-receiving circuit 4, a load 5, a second resonator 2, a first resonator 3, and a third resonator 11. The power-transmitting circuit 1, the second resonator 2, and the third resonator 11 may be provided in a power transmission apparatus. The first resonator 3, the power-receiving circuit 4, and the load 5 may be provided in a power receiving apparatus. The power receiving apparatus may be, for example, electronic equipment, such as a smartphone, a tablet terminal, or a portable terminal, or an electricity-operated machine, such as an electric vehicle. The power transmission apparatus may be a battery charger that wirelessly supplies power to the power receiving apparatus. The load 5 may be, for example, equipment having a secondary cell. The load 5 may be an external element of the wireless power-transmission system. FIG. 1 also depicts a power source 0 that supplies DC energy (energy may hereinafter be referred to as "power", for example, DC energy as "DC power" and AC energy as "AC power") to the power-transmitting circuit 1. The power source 0 may be included in this system or may be an element external to this system.

Each of the second resonator 2, the first resonator 3, and the third resonator 11 is a resonant circuit including a coil and a capacitor. In this system, contactless power transmission is performed between the second resonator 2 and the first resonator 3. Also, a foreign substance (object) can be sensed using electromagnetic coupling between the third resonator 11 and the first resonator 3. In the following description, a mode in which power is transmitted is referred to as a "power transmission mode", and a mode in which a foreign substance is sensed is referred to as a "foreign-substance sensing mode". The term "foreign substance" as used herein refers to an substance that generates heat when it comes close to the second resonator 2 or the first resonator 3. The foreign substance may be metal or a living body, such as a human body or animal.

The power-transmitting circuit 1 includes an inverter circuit 10, a power-transmission control circuit 15, a memory 14, an oscillator circuit 12, and a foreign substance detector 13. The memory 14 stores therein control parameters (which may also be referred to as "power transmission parameters") set for power transmission. Thus, the memory 14 may be referred to as a "power-transmission-parameter holding unit". The power transmission parameters are parameters regarding power-transmission control for a frequency and so on. Details of the power transmission parameters are described later. In the power transmission mode, the power-transmission control circuit 15, the inverter circuit 10, and the second resonator 2 wirelessly transmit power to the power receiving apparatus. In the foreign-substance sensing mode, the oscillator circuit 12 and the foreign substance detector 13 detect a foreign substance in the vicinity of the third resonator 11 or the first resonator 3.

Figure 2:
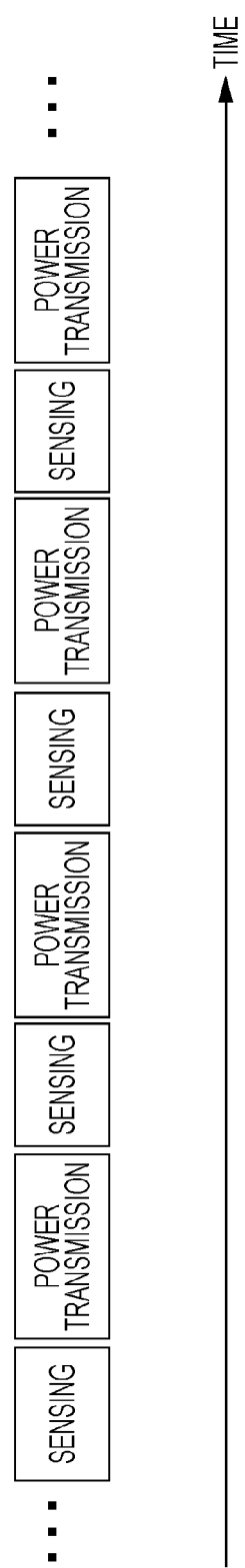
FIG. 2 is a diagram illustrating an overview of the operation of a wireless power-transmission system according to a first embodiment of the present disclosure.

FIG. 2 is a diagram illustrating a flow of processing performed by the power-transmitting circuit 1. The power-transmitting circuit 1 operates while switching between the power transmission mode and the foreign-substance sensing mode at predetermined time intervals. Each duration of the power transmission mode may be set to, for example, about a few seconds to several tens of seconds. Each duration of the foreign-substance sensing mode may be set to, for example, about a few milliseconds to several seconds. The present disclosure, however, is not limited to such examples.

The inverter circuit 10 is connected to the power source 0 and the second resonator 2. The inverter circuit 10 converts DC energy, input from the power source 0, into AC energy and supplies the AC energy to the second resonator 2. The power-transmission control circuit 15 controls switching of a plurality of switching elements included in the inverter circuit 10. Specifically, the power-transmission control circuit 15 performs control for switching the conductive state of each of the switching elements at a predetermined frequency. By doing so, the power-transmission control circuit 15 causes the AC energy to be output from the inverter circuit 10. For starting power transmission, the power-transmission control circuit 15 reads control parameters stored in the memory 14 and controls the inverter circuit 10 on the basis of the read control parameters. During power transmission, the power-transmission control circuit 15 varies the control parameters in accordance with the state of the load 5. When the mode changes from the power transmission mode to the foreign-substance sensing mode, the power-transmission control circuit 15 records the control parameters at this point in time to the memory 14. As a result, for starting the power transmission mode next time, it is possible to resume the power transmission on the basis of the immediately preceding control parameters.

The second resonator 2 and the first resonator 3 are configured so as to resonate at a frequency f0. In other words, the inductance of each coil and the capacitance of each capacitor are set so that the second resonator 2 and the first resonator 3 have a resonant frequency f0. The coil included in the second resonator 2 transmits the AC energy, supplied from the power-transmitting circuit 1, into space. The first resonator 3 receives at least part of the AC energy transmitted from the second resonator 2. The AC energy received by the first resonator 3 is sent to the power-receiving circuit 4. The power-receiving circuit 4 rectifies the received AC energy and supplies the resulting AC energy to the load 5.

The oscillator circuit 12 and the foreign substance detector 13 in the power-transmitting circuit 1 are driven in the foreign-substance sensing mode. The oscillator circuit 12 is configured so as to output a voltage including an AC component to the third resonator 11. The "voltage including an AC component" means a voltage including a component that varies cyclically. The voltage including an AC component is not limited to a voltage that changes in a sine waveform, and may be a voltage having any waveform that changes cyclically, for example, a triangular waveform or rectangular waveform.

The third resonator 11 and the first resonator 3 are configured so as to resonate at a frequency fr. In other words, the inductance of each coil and the capacitance of each capacitor are set so that the third resonator 11 and the first resonator 3 have a resonant frequency fr. When a voltage is supplied from the oscillator circuit 12 to the third resonator 11, the third resonator 11 forms a magnetic field therearound and electromagnetically couples with the first resonator 3.

The foreign substance detector 13 is connected to the oscillator circuit 12 and the power-transmission control circuit 15. The foreign substance detector 13 can detect a foreign substance 1000 that is present in the vicinity of the third resonator 11 or the first resonator 3. When the foreign substance 1000, such as metal, comes close to the third resonator 11 or the first resonator 3, the waveform of the voltage output from the oscillator circuit 12 changes. On the basis of the change, the foreign substance detector 13 determines whether or not a foreign substance is present. The foreign-substance sensing may be performed based on not only changes in the voltage but also changes in another physical quantity that changes according to a voltage. Examples of the "physical quantity that changes according to a voltage" as used herein include physical quantities, such as an input impedance, an input inductance, a Q value, and a coupling coefficient of the third resonator 11, in addition to the voltage. On the basis of a result of the foreign-substance sensing, the foreign substance detector 13 determines control parameters to be used for next power transmission and issues an instruction to the power-transmission control circuit 15. With this arrangement, power transmission after the foreign-substance sensing can be performed with high efficiency.

Next, a description will be given of a more specific configuration and operation of each constituent element.

Figure 3:
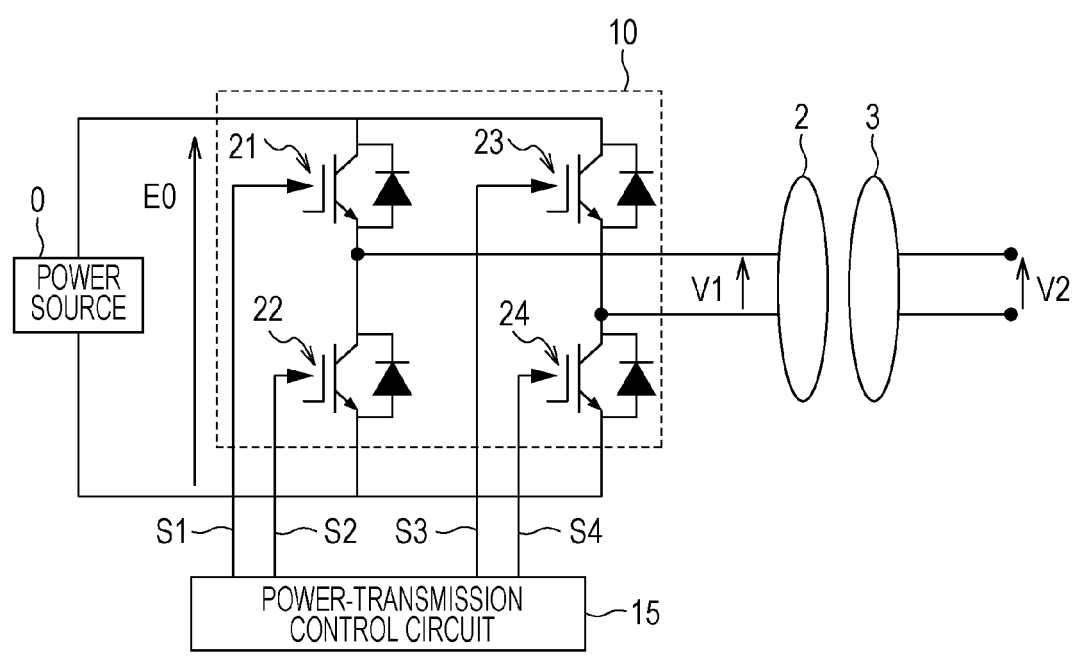
FIG. 3 is a diagram illustrating the configuration of an inverter circuit according to the first embodiment of the present disclosure.

FIG. 3 is a diagram illustrating a specific example of the configuration of the inverter circuit 10. The inverter circuit 10 in this example has a full-bridge inverter configuration. This inverter circuit 10 has four switching elements 21, 22, 23, and 24. The on states (electrical connections) and the off states (electrical disconnections) of the switching elements 21 to 24 are controlled according to respective control signals S1 to S4 input from the power-transmission control circuit 15. The second resonator 2 and the second resonator 3 have a resonant frequency f0. Thus, the switching frequency of the on/off state of each of the switching elements 21 to 24, that is, the power-transmission frequency, is set to a value close to f0. When the switching frequency of each switching element is varied, the input impedance of the second resonator 2 changes. As a result, the magnitude of an input voltage V1 of the second resonator 2 and the magnitude of an output voltage V2 of the first resonator 3 change.

Figure 4A:
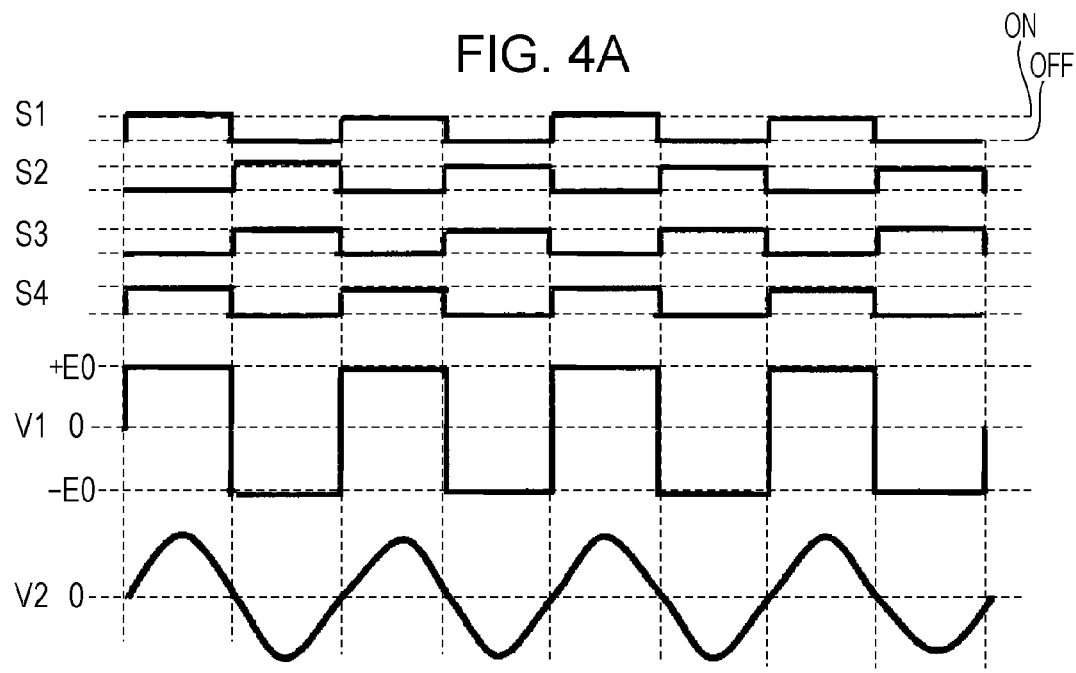
FIG. 4A is a graph illustrating the operation of an inverter circuit according to the first embodiment of the present disclosure.

FIG. 4A is a graph illustrating one example of changes with time in the control signals S1 to S4 output from the power-transmission control circuit 15, the voltage V1 output from the inverter circuit 10, and the voltage V2 output from the first resonator 3. In this example, the phases of the control signals S1 and S4 that determine the timings of the on/off states of the respective switching elements 21 and 24 match each other. Similarly, the phases of the control signals S2 and S3 that determine the timings of the on/off states of the respective switching elements 22 and 23 match each other. The timings at which the switching elements 21 and 24 are turned on and the timings at which the switching elements 21 are 24 turned off are displaced from each other by half a cycle. As a result, the voltage V1 output from the inverter circuit 10 has a waveform in which a period in which the voltage V1 has a positive value E0 and a period in which the voltage V1 has a negative value −E0 are alternately repeated. The voltage V2 output from the first resonator 3 has a sine waveform obtained by smoothing the voltage V1.

Figure 4B:
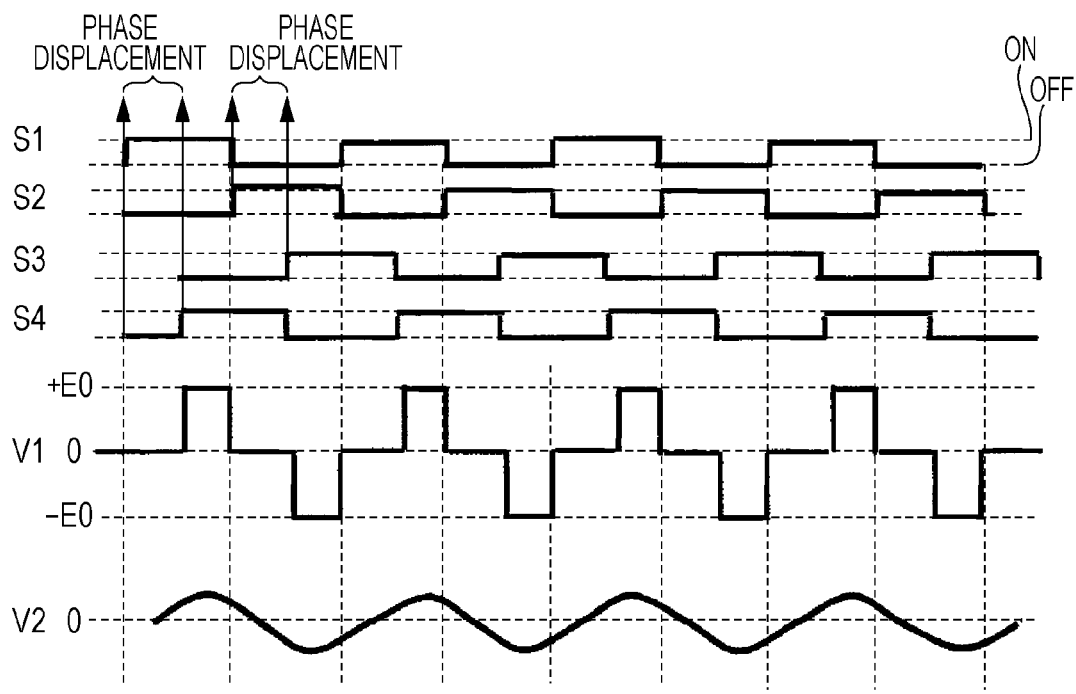
FIG. 4B is a graph illustrating the operation of an inverter circuit according to the first embodiment of the present disclosure.

FIG. 4B is a graph illustrating another example of changes with time in the control signals S1 to S4 and the voltages V1 and V2. In this example, phase displacement occurs between the control signal S1 and the control signal S4 and between the control signal S2 and the control signal S3. Thus, an output-time rate of the inverter circuit 10 is smaller than an output-time rate in the example in FIG. 4A. The "output-time rate" as used herein means the rate of time in which a voltage whose absolute value is larger than a predetermined value (e.g., about a few percent to 20 percent of the absolute value of the amplitude) is output in one cycle. The larger the output-time rate is, the higher the voltage applied to the load 5 is. In this example, the output-time rate is controlled through adjustment of the phases of the control signals input to the switching elements 21 to 24. When the phases of the two control signals input to two switching elements that are turned on at the same time are displaced from each other, the duty ratio of the output voltage V1 changes. As a result, the magnitude of the output voltage V2 of the first resonator 3 also changes.

During power transmission, there are cases in which the impedance of the load 5 changes. In such cases, the voltage applied to the load 5 changes. When the load 5 needs to be driven with a constant voltage, it is necessary to perform control so that a constant voltage is applied to the load 5 even when the impedance of the load 5 changes. Accordingly, by adjusting the phase of the timing of switching of each switching element, the power-transmission control circuit 15 performs control so that the voltage applied to the load 5 becomes constant. When the impedance of the load 5 changes, a frequency with which an optimum transmission efficiency is obtained also changes. Accordingly, the power-transmission control circuit 15 also varies the switching frequency of the on/off state of each switching element in accordance with the impedance of the load 5. That is, the power-transmission control circuit 15 controls the magnitude of the output voltage of the first resonator 3 by using the switching frequency of the on/off state of each switching element and the phase of the control signal as the control parameters.

Changes in the impedance of the load 5 may be transmitted from the power-receiving circuit 4 to the power-transmitting circuit 1, for example, via a communication circuit (not illustrated). One example of a method for transmitting information from the power-receiving circuit 4 to the power-transmitting circuit 1 is a method in which a switch for changing a load impedance is provided at an output end of the power-receiving circuit 4 and is turned on/off at a frequency that is sufficiently different from the frequency of the inverter circuit 10. Through the turning on/off of the switch, load impedance changes detected by the power-receiving circuit 4 can be frequency-modulated and can be transmitted to the power-transmitting circuit 1 as information. The power-transmitting circuit 1 can read the transmitted information by detecting changes in a voltage across two opposite ends of the second resonator 2, the changes being caused by the turning on/off of the switch, and changes in the amount of current, the changes occurring at an input end of the inverter circuit 10, and demodulating a result of the detection. The present disclosure is not limited to such a method, and the information may be transmitted using another communication method using near field communication (NFC), a wireless local area network (LAN), or the like.

The output-time rate may be adjusted not only by using the amount of phase displacement between the control signals but also by varying the duty ratio of each control signal. For example, a reduction in the duty ratio of each control signal can reduce the duty ratio of the output voltage V1. Thus, the power-transmission control circuit 15 may be configured so as to adjust the duty ratio of each control signal, instead of the phase.

Although the inverter circuit 10 in the example illustrated in FIG. 3 is a full-bridge inverter, the inverter circuit 10 is not limited to this example. The inverter circuit 10 may be, for example, a half-bridge inverter having two switching elements and two capacitors. Alternatively, the inverter circuit 10 may be a class-E amplifier having one switching element, two inductors, and two capacitors. Even with such configurations, the magnitude of the output of the first resonator 3 can be controlled by using the power-transmission frequency, the phase of the switching timing, and so on as the control parameters.

A DC/DC converter may also be provided between the power source 0 and the inverter circuit 10. With this configuration, the DC/DC converter varies a DC voltage input to the inverter circuit 10, to thereby make it possible to control the output voltage of the inverter circuit 10. When such a DC/DC converter is provided, it is not necessary to adjust the phase and the duty ratio of the control signal input to each switching element in the inverter circuit 10. In such a case, the switching frequency of each switching element and the duty ratio which determine the output voltage of the DC/DC converter may be set as the control parameters.

The power-transmission-parameter holding unit 14 is a memory that stores therein various control parameters needed for power transmission. The power-transmission-parameter holding unit 14 stores, as global initial values, the values of control parameters used when initial power transmission is started. After power transmission is temporarily stopped, the power-transmission-parameter holding unit 14 also stores, as local initial values, the values of control parameters needed to resume the next power transmission.

The power-transmission control circuit 15 is a circuit for controlling the operation of the inverter circuit 10 in the power transmission mode. The power-transmission control circuit 15 can be implemented by, for example, a combination of a gate driver and a processor. In the foreign-substance sensing mode, the power-transmission control circuit 15 stops outputs of the inverter circuit 10 so that the second resonator 2 does not generate an electromagnetic field. This eliminates the influence of a magnetic field due to transmitted power and improves the sensitivity of foreign-substance sensing. When the mode changes from the power transmission mode to the foreign-substance sensing mode, the power-transmission control circuit 15 updates the local initial values, recorded in the power-transmission-parameter holding unit 14, with the values of the control parameters used immediately before outputs of the inverter circuit 10 are stopped. The updated local initial values are re-set when the power transmission mode is resumed next time after foreign-substance sensing processing is performed.

When the foreign substance 1000, such as metal, is present in the vicinity of the second resonator 2 and the first resonator 3 during power transmission, a magnetic field generated by the second resonator 2 can cause eddy current in the foreign substance 1000. In such cases, when the power transmission is continued, the foreign substance 1000 generates heat. Accordingly, in the wireless power-transmission system in the present embodiment, the oscillator circuit 12, the foreign substance detector 13, and the third resonator 11 are used to sense the foreign substance 1000.

The oscillator circuit 12 can be implemented by a self-oscillating oscillator circuit based on an LC resonance principle. Examples include a Colpitts oscillator circuit, a Hartley oscillator circuit, a Clapp oscillator circuit, a Franklin oscillator circuit, and a Pierce oscillator circuit. The oscillator circuit 12 is not limited to these examples and may be implemented by another oscillator circuit.

The foreign substance detector 13 is a processor that controls the oscillator circuit 12 and performs foreign-substance sensing processing. The foreign substance detector 13 can be implemented by, for example, a combination of a central processing unit (CPU) and a memory in which a computer program is stored. The foreign substance detector 13 may also be dedicated hardware configured so as to realize operations described below.

The first resonator 3 in the present embodiment is configured with a parallel resonant circuit including a coil and a capacitor. The third resonator 11 is configured so that it can electromagnetically couple with the first resonator 3. The first resonator 3 and the third resonator 11 both have the resonant frequency fr. The foreign substance detector 13 determines the presence/absence a foreign substance, on the basis of a physical quantity, such as a voltage across two opposite ends of the third resonator 11 when the oscillator circuit 12 oscillates.

Next, the foreign-substance sensing processing will be described in detail. One principle of the foreign-substance sensing in this example is that the presence/absence of a foreign substance is determined by measuring changes in a physical quantity, such as a voltage, the changes being caused by magnetic field blocking by the foreign substance 1000, such as metal.

Figure 5A:
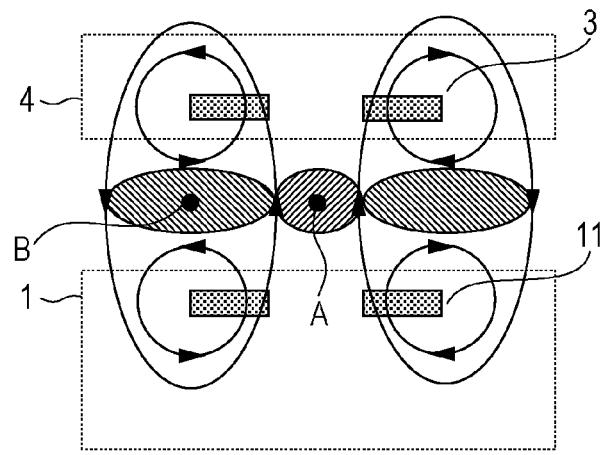
FIG. 5A is a schematic diagram illustrating a flow of magnetic flux in a magnetic-field mode (an odd mode) for a low frequency of a device according to the first embodiment of the present disclosure.
Figure 5B:
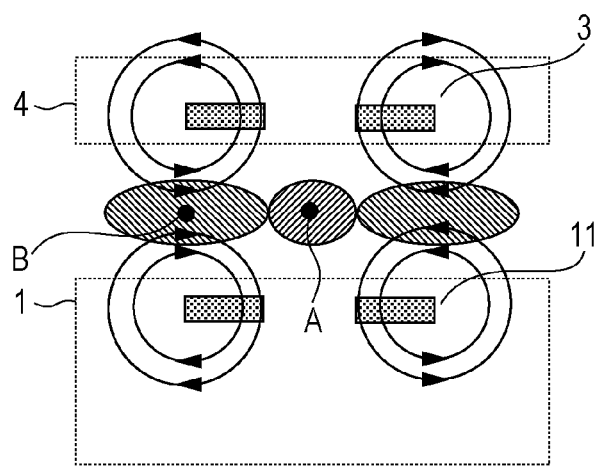
FIG. 5B is a schematic diagram illustrating a flow of magnetic flux in a magnetic-field mode (an even mode) for a high frequency of a device according to the first embodiment of the present disclosure.

FIGS. 5A and 5B are schematic diagrams illustrating flows of magnetic fluxes in two magnetic-field modes when the first resonator 3 and the third resonator 11 couple each other. FIGS. 5A and 5B each illustrate a cross section when the coil of the first resonator 3 and the coil of the third resonator 11 are sectioned along a plane orthogonal to the plane of the coils, when the coils are placed parallel to each other with their central axes being aligned with each other. FIG. 5A illustrates a magnetic-field mode when the first resonator 3 and the third resonator 11 electromagnetically couple to each other at a frequency f10 lower than the resonant frequency fr. Such a magnetic-field mode is referred to as an "odd mode". FIG. 5B illustrates a magnetic-field mode when the first resonator 3 and the third resonator 11 electromagnetically couple to each other at a frequency f20 higher than the resonant frequency fr. Such a magnetic-field mode is referred to as an "even mode".

As illustrated in FIG. 5A, when the first resonator 3 and the third resonator 11 electromagnetically couple to each other at the frequency f10 lower than the resonant frequency fr, magnetic fields between the two resonators 3 and 11 are concentrated at a center portion A. That is, the magnetic fluxes are oriented in the same direction to strengthen each other at the center portion A between the two coils. Thus, the magnetic flux at the center portion A is dense. In contrast, at a peripheral portion B between portions from the inside diameters of the two coils to the outside diameters thereof, the magnetic fluxes are oriented in opposite directions to cancel each other out. Thus, the magnetic flux at the peripheral portion B is sparse. On the other hand, as illustrated in FIG. 5B, when the first resonator 3 and the third resonator 11 electromagnetically couple to each other at the frequency f20 higher than the resonant frequency fr, the magnetic fields of the two resonators 3 and 11 are concentrated at the peripheral portion B. That is, the magnetic flux at the center portion A between the coils becomes sparse, and the magnetic flux at the peripheral portion B, which is a portion from the inside diameters of the two coils to the outside diameters thereof, becomes dense.

When a foreign substance is present between the first resonator 3 and the third resonator 11, it can be thought that the denser the magnetic flux at the position of the foreign substance is, the larger the changes in the voltage across the two opposite ends of the third resonator 11 become. That is, when the oscillation frequency is f10, it can be thought that the accuracy of detecting a foreign substance that is present at the center portion A improves. Conversely, when the oscillation frequency is f20, it can be thought that the accuracy of detecting a foreign substance that is present at the peripheral portion B improves.

The above description also applies to a case in which the second resonator 2 and the first resonator 3 electromagnetically couple to each other. That is, when the second resonator 2 and the first resonator 3 electromagnetically couple to each other at a frequency f11 lower than the resonant frequency f0, the magnetic fields between the two resonators 2 and 3 are concentrated at the center portion A. Thus, the magnetic flux at the center portion A becomes dense, and the magnetic flux at the peripheral portion B becomes sparse. On the other hand, when the second resonator 2 and the first resonator 3 electromagnetically couple to each other at a frequency f21 higher than the resonant frequency f0, the magnetic fields between the two resonators 2 and 3 are concentrated at the peripheral portion B. Thus, the magnetic flux at the peripheral portion B becomes sparse, and the magnetic flux at the center portion A becomes dense.

When a foreign substance enters between the second resonator 2 and the first resonator 3 during power transmission, the smaller the amount of magnetic flux that is blocked, the smaller the amount of heat generated by the foreign substance. Thus, when a foreign substance is present in the vicinity of the center portion of the coil of the second resonator 2, it can be thought that heat generation can be reduced when the oscillator circuit 12 is made to oscillate at the frequency f21, compared with a case in which the oscillator circuit 12 is made to oscillate at the frequency f11. On the other hand, when a foreign substance is present in the vicinity of the peripheral portion of the coil of the second resonator 2, it can be thought that heat generation can be reduced when the oscillator circuit 12 is made to oscillate at the frequency f11, compared with a case in which the oscillator circuit 12 is made to oscillate at the frequency f21.

Accordingly, in the foreign-substance sensing mode, the foreign substance detector 13 in the present embodiment determines to which of the center portion A and the peripheral portion B a foreign substance is closer. In the subsequent power transmission mode, the foreign substance detector 13 instructs the power-transmission control circuit 15 so as to transmit power at a frequency with which the amount of magnetic flux at the position where a foreign substance is thought to be present decreases. More specifically, the foreign substance detector 13 determines whether or not a change in the voltage when the oscillator circuit 12 oscillates at the frequency f10 is larger than a change in the voltage when the oscillator circuit 12 oscillates at the frequency f20. When the former is larger than the latter, and this change exceeds a predetermined threshold, the foreign substance detector 13 instructs the power-transmission control circuit 15 so as to transmit power at the frequency f21. Conversely, when the latter is larger than the former, and this change exceeds the predetermined threshold, the foreign substance detector 13 instructs the power-transmission control circuit 15 so as to transmit power at the frequency f11. Performing such control makes it possible to suppress a reduction in the power transmission efficiency which is caused by a foreign substance.

Figure 6:
FIG. 6 is a graph illustrating frequencies for foreign-substance sensing and frequencies for power transmission in a device according to the first embodiment of the present disclosure.

FIG. 6 is a graph schematically illustrating relationships between the frequencies f10, fr, and f20 for foreign-substance sensing and the frequencies f11, f0, and f21 for power transmission. When the two resonators electromagnetically couple to each other, the resonant frequency is divided into two frequencies. Four mountains in FIG. 6 indicate that coupling between the resonators becomes strong at two pairs of divided resonant frequencies during foreign-substance sensing and during power transmission. When the frequencies f10, f20, f11, and f21 are set to values close to these divided resonant frequencies, the wireless power-transmission system can be operated with high efficiency. As described above, the frequencies f10, fr, f20, f11, f0, and f21 have relationships given by f10<fr<f20 and f11<f0<f21. The frequency f0 may be set to a value, for example, in the range of 100 kHz to 200 kHz. The frequency fr may be set to a value, for example, in the range of 500 kHz to 1.5 MHz. The frequencies f0 and fr may be set to values outside these ranges. In the present embodiment, the frequency fr is higher than the frequency f0. However, the frequencies f0 and fr may be made equal to each other, or the frequency f0 may be made higher than the frequency fr.

Figure 7:
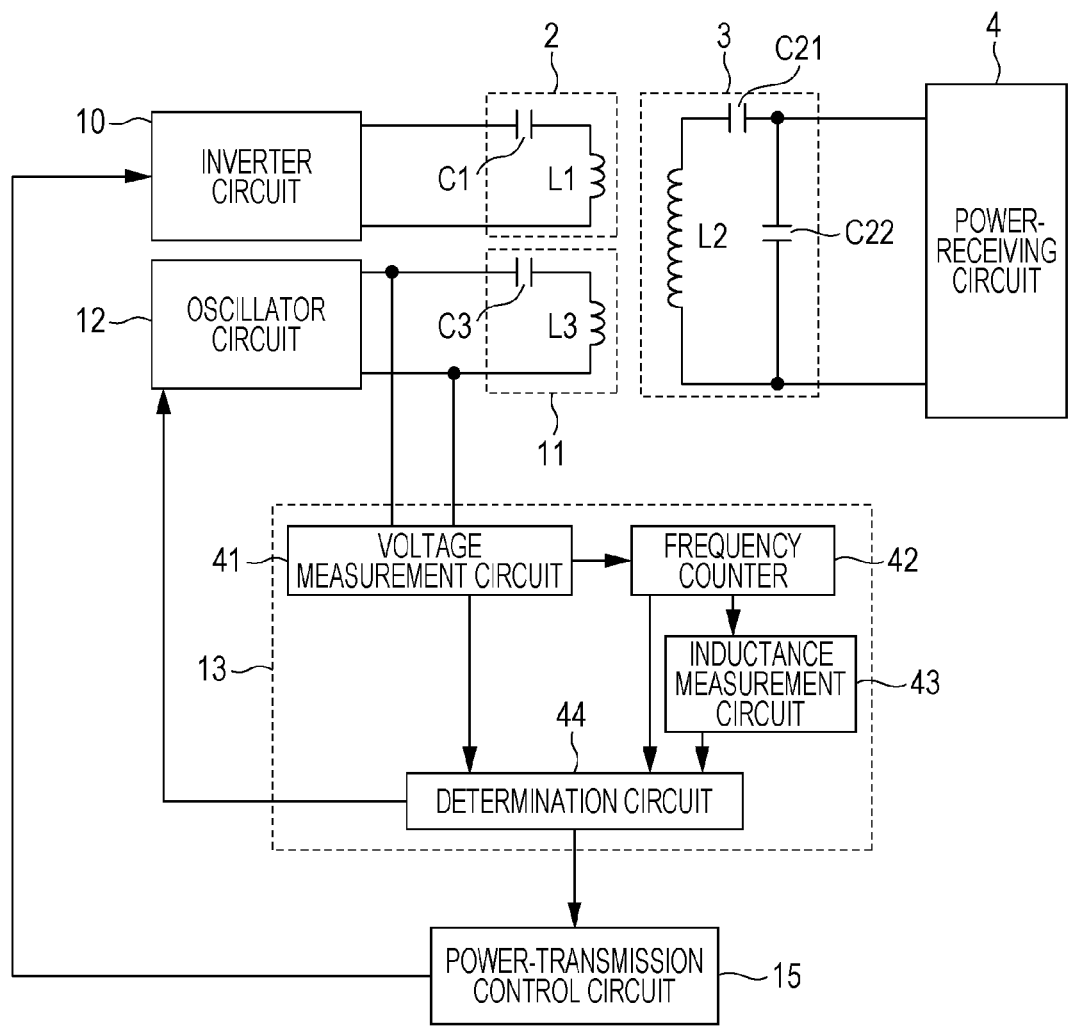
FIG. 7 is a block diagram illustrating a foreign substance detector according to the first embodiment of the present disclosure.

FIG. 7 is a diagram illustrating a specific configuration of the foreign substance detector 13, the second resonator 2, the first resonator 3, and the third resonator 11. The foreign substance detector 13 has a voltage measurement circuit 41, a frequency counter 42, an inductance measurement circuit 43, and a determination circuit 44. The second resonator 2 has an inductor L1 and a resonant capacitor C1 connected in series with the inductor L1. The first resonator 3 has an inductor L2, a resonant capacitor C21 connected in series with the inductor L2, and a capacitor C22 connected in parallel with the inductor L2. The first resonator 3 has a parallel resonant circuit including the inductor L2 (a coil) and the capacitor C22. The third resonator 11 has an inductor L3 and a resonant capacitor C3 connected in series with the inductor L3. In the following description, the inductances of the inductors L1, L2, and L3 are also represented by symbols L1, L2, and L3, respectively. Similarly, the capacitances of the capacitors C1, C21, C22, and C3 are also represented by symbols C1, C21, C22, and C3, respectively. L1 and C1 and L2 and C21 are set so that the resonant frequency of the second resonator 2 and the first resonator 3 becomes f0. L2 and C22 and L3 and C3 are set so that the resonant frequency of the first resonator 3 and the third resonator 11 becomes fr. C22 is set so that the capacitor C22 is substantially open at the frequency f0. C21 is set so that the capacitor C21 is substantially short-circuited at the frequency fr.

As described above, the foreign substance detector 13 can be implemented by a combination of a processor, such as a CPU, and a memory in which a computer program that specifies the foreign-substance sensing processing in the present embodiment is stored. Alternatively, the foreign substance detector 13 may be a dedicated circuit configured so as to perform a similar operation. The voltage measurement circuit 41, the frequency counter 42, the inductance measurement circuit 43, and the determination circuit 44 in FIG. 7 do not necessarily have to be separated discrete circuit elements. The operations of the above-described individual elements may be realized by a single processor executing individual steps in the computer program.

Figure 8:
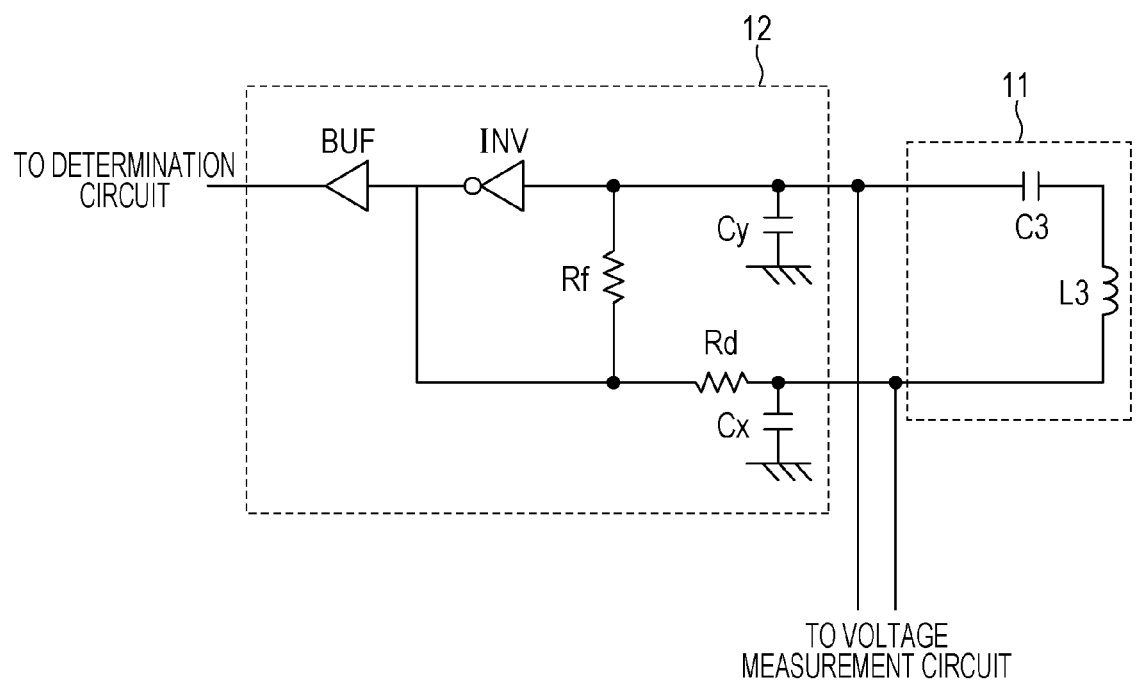
FIG. 8 is a diagram illustrating one example of an oscillator circuit according to the first embodiment of the present disclosure.

FIG. 8 is a circuit diagram illustrating an example of the configuration of the oscillator circuit 12. The oscillator circuit 12 in this example is a self-oscillating Pierce oscillator circuit. This oscillator circuit 12 has two resonant capacitors Cx and Cy, an inverter INV, resistors Rf and Rd, and a buffer circuit BUF. The inverter INV amplifies an input waveform by using power supplied from a power source (not illustrated) and outputs the amplified input waveform. The resistors Rf and Rd are elements that adjust the excitation level of the circuit. The oscillator circuit 12 is not limited to such a circuit configuration and may be implemented by an oscillator circuit having another configuration.

For starting the foreign-substance sensing processing, first, the determination circuit 44 sends a trigger signal for starting the processing to the power-transmission control circuit 15 and the oscillator circuit 12. Upon receiving the trigger signal, the power-transmission control circuit 15 stops the power supply to the second resonator 2, as described above. Upon receiving the trigger signal, the oscillator circuit 12 starts to oscillate at the frequency f10. When the oscillator circuit 12 starts to oscillate, and a predetermined time passes, the voltage measurement circuit 41 measures the voltage across the two opposite ends of the third resonator 11. The voltage measurement circuit 41 outputs a result of the measurement to the determination circuit 44 and the frequency counter 42. Upon receiving an input from the voltage measurement circuit 41, the frequency counter 42 determines the frequency (oscillation frequency) of the voltage across the two opposite ends of the third resonator 11. The frequency counter 42 outputs information indicating the result of the determination to the determination circuit 44. On the basis of information of the input voltage and information of the oscillation frequency, the determination circuit 44 determines the presence/absence of a foreign substance.

When the foreign substance is an substance (e.g., a ring-shaped metal foreign substance) that is likely to shield a magnetic field, current having a phase that is opposite to that of the coils flows on the metal surface. As a result, the input inductance of the third resonator 11 decreases. When the input inductance decreases, the oscillation frequency of the third resonator 11 increases. Thus, the determination circuit 44 compares the input frequency with the frequency f10 and determines whether or not the difference therebetween is larger than a predetermined threshold. When the difference is larger than the predetermined threshold, it can be determined that a foreign substance is present. Alternatively, the input inductance of the third resonator 11 is determined based on the input frequency, and when the value of the determined input inductance is smaller than or equal to the predetermined threshold, it may be determined that a foreign substance is present.

When a metal foreign substance is an substance (e.g., iron) that is unlikely to shield a magnetic field, the input inductance value is less likely to change, since a magnetic field passes through the foreign substance. However, when a magnetic field passes through such a foreign substance, eddy current is generated, and a voltage drop occurs in the voltage across the two opposite ends of the third resonator 11. As a result, the amplitude of the oscillation voltage decreases. Accordingly, when the amplitude of the voltage reaches a predetermined threshold or less, it can be determined that a foreign substance is present.

The foreign substance detector 13 also makes a similar determination when the oscillator circuit 12 is made to oscillate at the frequency f20. This makes it possible to sense not only a foreign substance in the vicinity of the center portion of the coil but also a foreign substance in the vicinity of the peripheral portion of the coil. The determination circuit 44 determines the presence/absence of a foreign substance in the manner described above and outputs the result of the determination to the power-transmission control circuit 15.

Although the above description has been given of a case in which the foreign-substance determination is made at both of the frequencies f10 and f20, the presence/absence of a foreign substance may be determined using only one of the frequencies f10 and f20. For example, when it is desired to detect only the presence/absence of a foreign substance in the vicinity of the center portion of the coil of the third resonator 11, the determination may be made using only the frequency f10. Conversely, when it is desired to detect only a foreign substance in the vicinity of the peripheral portion of the coil, the determination may be made using only the frequency f20. When the determination is made using only one of the frequencies f11 and f12, the processing time is reduced compared with a case in which both of the frequencies f11 and f12 are used. Thus, there is a practical advantage that the period of time in which the power transmission is stopped can be reduced. In this case, the frequency f10 may be set to, for example, 85% or less of the resonant frequency fr. The frequency f20 may be set to, for example, 115% or more of the resonant frequency fr. The present disclosure is not limited to these values.

Although the second resonator 2 and the third resonator 11 have been described above as having a configuration in which the resonant capacitor is connected in series with the coil, the present disclosure is not limited to such a configuration. The resonant capacitor may be connected in parallel with the coil. Alternatively, the second resonator 2 and the third resonator 11 may include a resonant capacitor connected in series with the coil and a resonant capacitor connected in parallel with the coil.

Although the amplitude of the oscillation voltage, the oscillation frequency, and the inductance value are assumed to be used as measurement items for making the determination, the present disclosure is not limited thereto. With a physical quantity calculated based on these physical quantities, a foreign substance can be detected in the same manner. For example, the presence/absence of a foreign substance may be determined using a characteristic value, such as a Q value of each resonator.

With the configuration described above, power can be transmitted to even a power receiving apparatus (such as a smartphone) having one power-receiving coil, and a single power transmission apparatus having a small area of a mounting stand can be provided. It is also possible to provide a power transmission apparatus that can continuously transmit power with high efficiency.

The foreign substance detector can sense not only the presence/absence of a foreign substance between the power-transmitting coil and the power-receiving coil but also the presence/absence of a foreign substance even when the foreign substance is present in the vicinity of the power-transmitting coil or the power-receiving coil.

Thus, even when a foreign substance is present in the vicinity of the power-transmitting coil or the power-receiving coil, it is possible to continue the power transmission while preventing overheating of the foreign substance.

Figure 9:
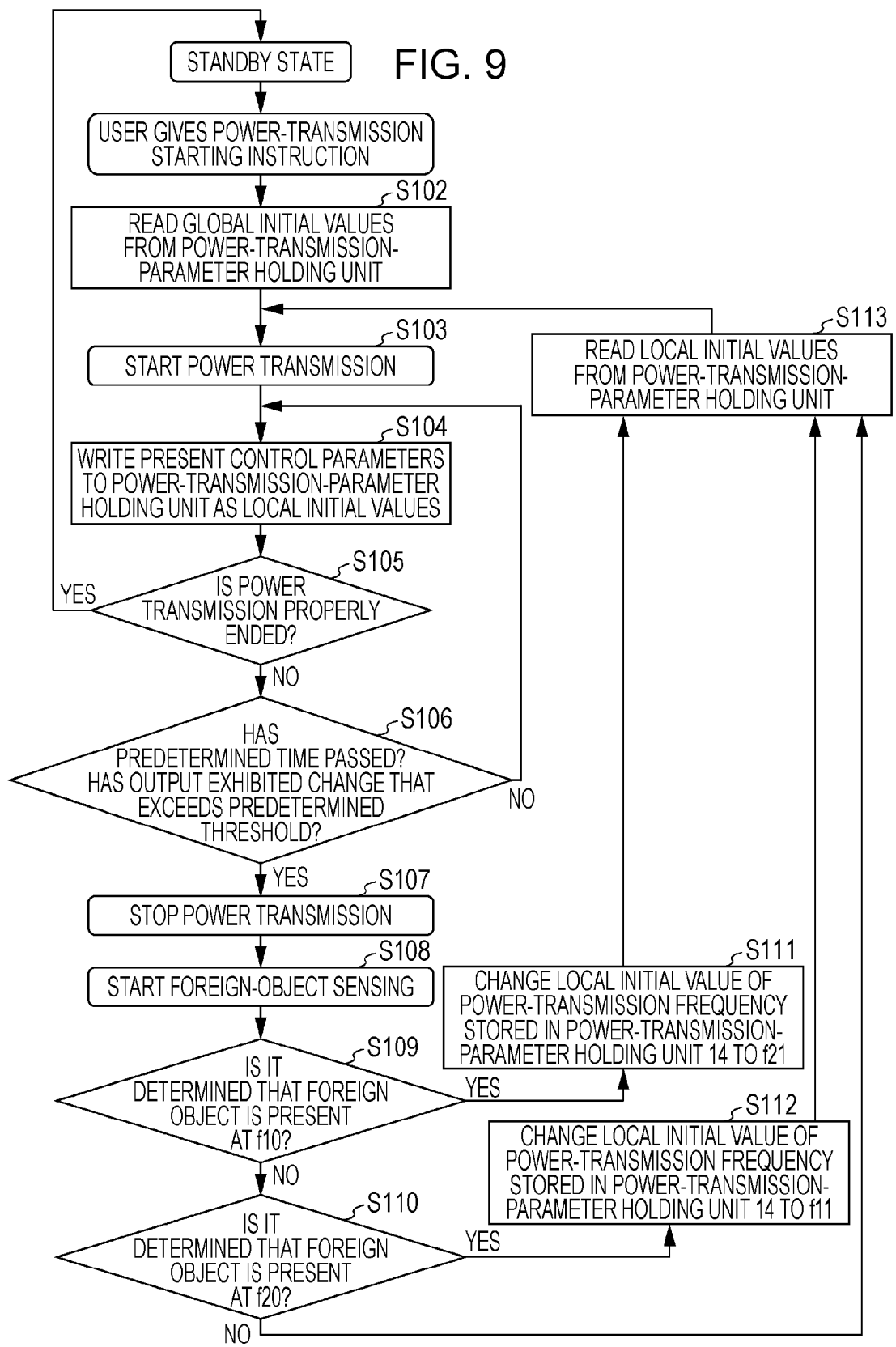
FIG. 9 is a flowchart illustrating the operation of a wireless power-transmission system according to the first embodiment of the present disclosure.

Next, a flow of overall control of the power transmission and the foreign-substance sensing will be described with reference to a flowchart in FIG. 9. First, in a standby state, when a user gives a power-transmission starting instruction, the power-transmission control circuit 15 reads global initial values from the power-transmission-parameter holding unit 14 (step S102). Thereafter, power transmission is started using the control parameter values (step S103). In this case, the power-transmission starting instruction given by a user means that, for example, the user turns on the switch of the power source 0 to trigger power transmission of the power-transmitting circuit 1. Alternatively, the power transmission of the power-transmitting circuit 1 may be triggered when a terminal including the first resonator 3, the power-receiving circuit 4, and the load 5 is placed on a power-transmitting unit including the power-transmitting circuit 1, the second resonator 2, and the third resonator 11.

After the power transmission is started, the power-transmission control circuit 15 adjusts the control parameters so that the voltage output to the load 5 becomes constant, while transmitting power, as described above. The control parameters obtained at this point are written to the power-transmission-parameter holding unit 14 as local initial values (step S104). When local initial values are already recorded, the local initial values are updated. Next, a determination is made as to whether or not the power transmission is properly ended (step S105). The ending of the power transmission is determined, for example, by detecting a power transmission stopping instruction given by the user or detecting completion of charging when the load is a rechargeable battery. If the power transmission is properly ended, the power-transmitting circuit 1 enters the standby state again. On the other hand, when the foreign-substance sensing processing is periodically performed if the power transmission is continued, the power transmission is stopped when a predetermined time passes after the power transmission is started, and the process proceeds to the foreign-substance sensing processing (steps S106 to S108). Also, even when the predetermined time has not passed, outputs (voltages or the like) of the power-transmitting circuit 1 and the power-receiving circuit 4 are monitored, and when any of the outputs has exhibited a sharp change that exceeds a predetermined threshold, the power transmission is also stopped, and the process proceeds to the foreign-substance sensing processing.

The foreign-substance sensing processing is performed using the method described above. First, the determination circuit 44 causes the oscillator circuit 12 to oscillate at the frequency f10 to determine the presence/absence of a foreign substance (step S109). Upon determining that a foreign substance is present, the determination circuit 44 varies the local initial value of the power-transmission frequency stored in the power-transmission-parameter holding unit 14 to f21 (step S111). The power-transmission control circuit 15 reads the local initial value from the power-transmission-parameter holding unit 14 and resumes the power transmission at the frequency f21 (steps S113 and S103).

Upon determining that no foreign substance is present in step S109, the determination circuit 44 causes the oscillator circuit 12 to oscillate at the frequency f20 to determine the presence/absence of a foreign substance (step S110). Upon determining that a foreign substance is present, the determination circuit 44 changes the local initial value of the power-transmission frequency stored in the power-transmission-parameter holding unit 14 to f11 (step S112). The power-transmission control circuit 15 reads the local initial value from the power-transmission-parameter holding unit 14 and resumes the power transmission at the frequency f11 (steps S113 and S103).

When it is determined in step S110 that no foreign substance is present, the power-transmission control circuit 15 reads the local initial value from the power-transmission-parameter holding unit 14 and resumes the power transmission (steps S113 and S103). In this case, the power transmission is resumed at the same frequency as that of the immediately previous power transmission.

Through the above-described control, the power transmission can be continued using a frequency with which the magnetic flux density at the position where a foreign substance is thought to be present decreases, when it is determined that a foreign substance is present. With this arrangement, it is possible to continue the power transmission while reducing heat generation of a foreign substance. On the other hand, when it is determined that no foreign substance is present, the power transmission can be resumed using the control parameter value used immediately before the power transmission is stopped. This can eliminate the need to perform adjustment again so that the load voltage becomes constant. Compared with a case in which the power transmission is resumed using the control parameters having the global initial values, it is possible to suppress a decrease in the transmission efficiency.

As described above, according to the present embodiment, even when a foreign substance is present in the vicinity of the coil, the power transmission can be continued while reducing heat generation of the foreign substance. In addition, it is possible to suppress a decrease in the efficiency which is caused by initialization of power transmission processing when no foreign substance is present.

Figure 10:
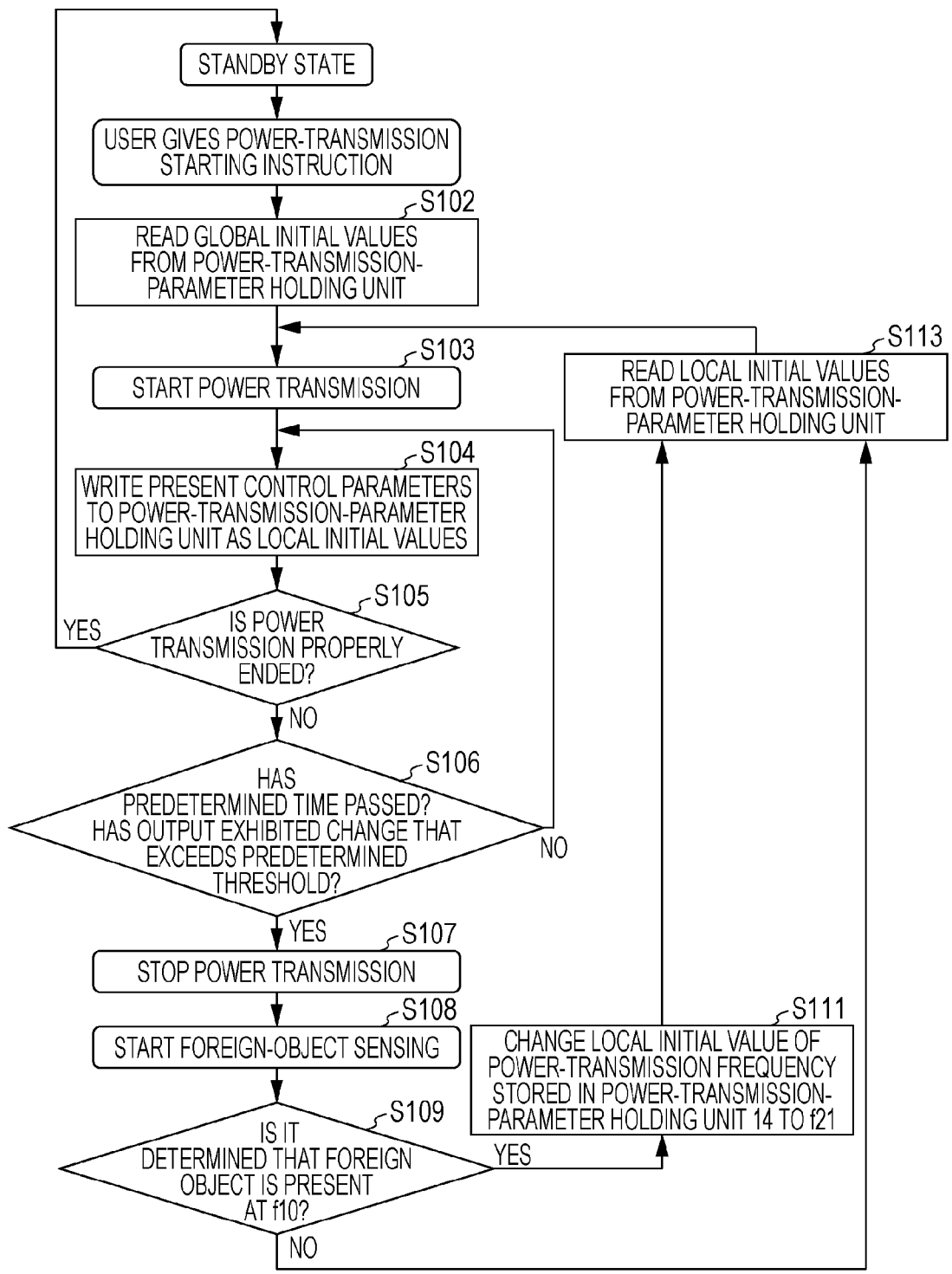
FIG. 10 is a flowchart illustrating operations in a modification of the wireless power-transmission system according to the first embodiment of the present disclosure.

Although, in the foreign-substance sensing processing in the present embodiment, the presence/absence of a foreign substance is determined using the two frequencies f10 and f20, the presence/absence of a foreign substance may be determined using at least one of the frequencies f10 and f20. FIG. 10 is a flowchart illustrating operations when foreign-substance sensing is performed using only the frequency f10. In this example, if it is determined in step S109 that no foreign substance is present, no subsequent determination is made, and the power transmission is started using the control parameters used in the immediately previous power transmission. Such an operation is also effective, since it is possible to suppress a reduction in the transmission efficiency which is caused by a foreign substance in the vicinity of the center portion of the coil. Steps S109 and S111 in FIG. 10 may be replaced with steps (steps S110 and S112 in FIG. 9) in which the foreign-substance sensing is performed using the frequency f20. In such a case, it is possible to suppress a reduction in the transmission efficiency which is caused by a foreign substance in the vicinity of the peripheral portion of the coil.

In the present embodiment, although the control parameters during power transmission are recorded as the local initial values and are used during next power transmission, such an operation is not essential. When the local initial values are not recorded, and it is determined that no foreign substance is present, the control parameters may be returned to the global initial values to resume the power transmission. In such a case, there is an advantage that, when a foreign substance is detected, the power transmission can be resumed at a frequency with which the amount of magnetic flux at the position where the foreign substance is thought to be present decreases.

Although the present embodiment is based on the premise that a foreign substance is sensed, it is not necessary to output information explicitly indicating the presence/absence of a foreign substance. It is sufficient that the power-transmitting circuit 1 be configured so that a control parameter, such as a power-transmission frequency, is set to an appropriate value, when a voltage output from the oscillator circuit 12 or a physical quantity that changes according to the voltage changes significantly from a predetermined reference value.

Second Embodiment

Figure 11:
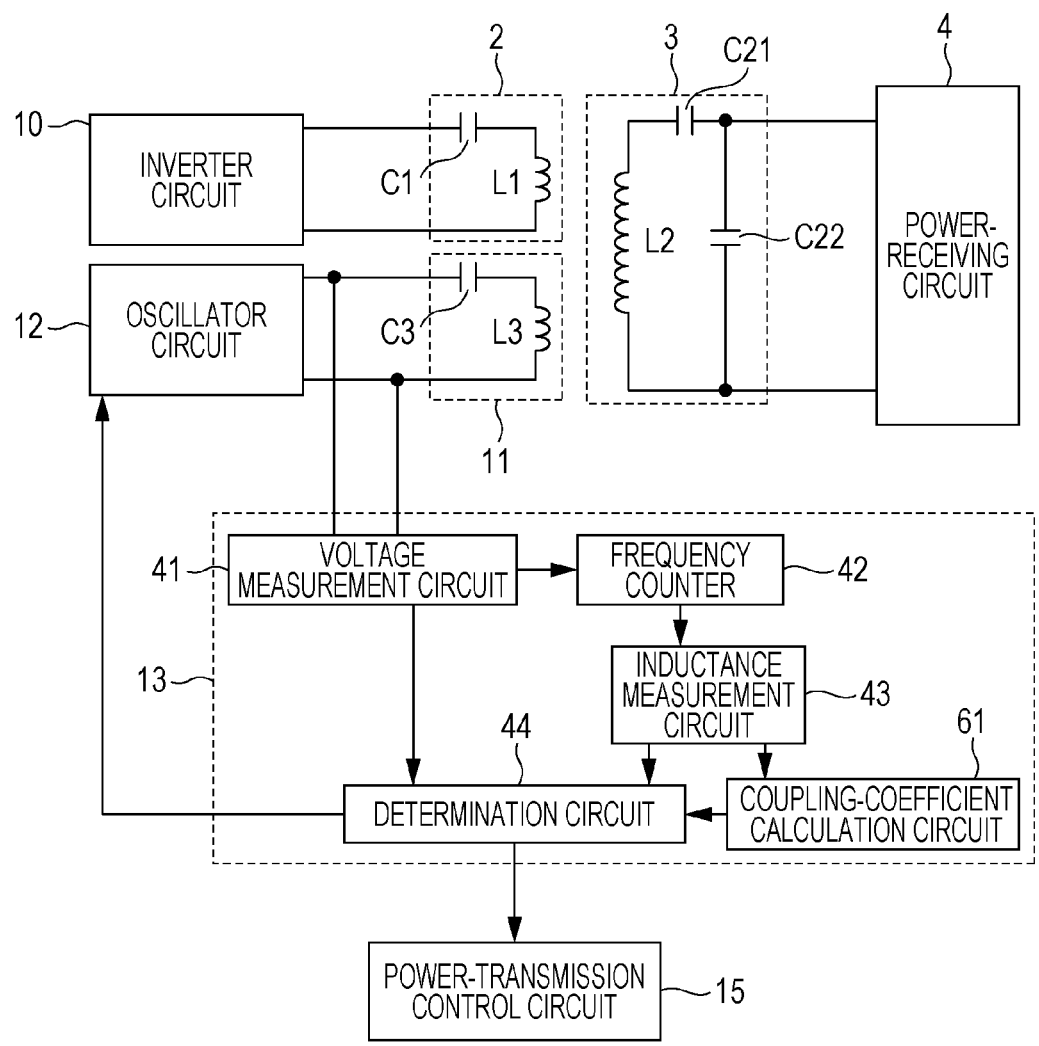
FIG. 11 is a diagram illustrating a foreign substance detector according to a second embodiment of the present disclosure.

FIG. 11 is a diagram illustrating the configuration of a foreign substance detector 13 in a second embodiment of the present disclosure. The present embodiment differs from the first embodiment in that the foreign substance detector 13 senses a foreign substance on the basis of a coupling coefficient of coupling between the third resonator 11 and the first resonator 3. Hereinafter, points that are different from the first embodiment are mainly described, and the same or similar points are not described.

The foreign substance detector 13 in the present embodiment has an inductance measurement circuit 43 that measures an input inductance value of the third resonator 11 and a coupling-coefficient calculation circuit 61 that calculates a coupling coefficient. The coupling-coefficient calculation circuit 61 calculates a coupling coefficient k on the basis of the ratio of an input inductance value Lin(f10) of the third resonator 11, the input inductance value Lin(f10) being measured by the inductance measurement circuit 43 when the oscillator circuit 12 oscillates at the frequency f10, to an input inductance value Lin(f20) of the second resonator 2, the input inductance value Lin(f20) being measured by the inductance measurement circuit 43 when the oscillator circuit 12 oscillates at the frequency f20. A foreign substance between the third resonator 11 and the first resonator 3 can be detected based on the coupling coefficient k.

The coupling coefficient k changes depending on a foreign substance between the third resonator 11 and the first resonator 3. For example, when a metal foreign substance that completely shields magnetic fields is present between the coils, and the second resonator 2 and the third resonator 11 do not electromagnetically couple to each other, the coupling coefficient k has a value of zero or a small value that can be approximated to zero. On the other hand, when no metal foreign substance is present between the coils, the coupling coefficient k has a value that is larger than zero and that is smaller than or equal to 1. Thus, the presence/absence of a metal foreign substance between the third resonator 11 and the first resonator 3 can be determined based on a calculated value or an estimated value of the coupling coefficient k.

When the third resonator 11 (the inductance L3 of the coil) and the first resonator 3 (the inductance L2 of the coil), which resonates at the frequency fr, electromagnetically couple to each other with the coupling coefficient k, an input inductance Lin viewed from the coil L3 of the third resonator 11 can be determined based on:

$$Lin(f) = L3\{1 - k^2/(1-(fr/f)^2)\} \quad \text{(expression 1)}$$

Figure 12:
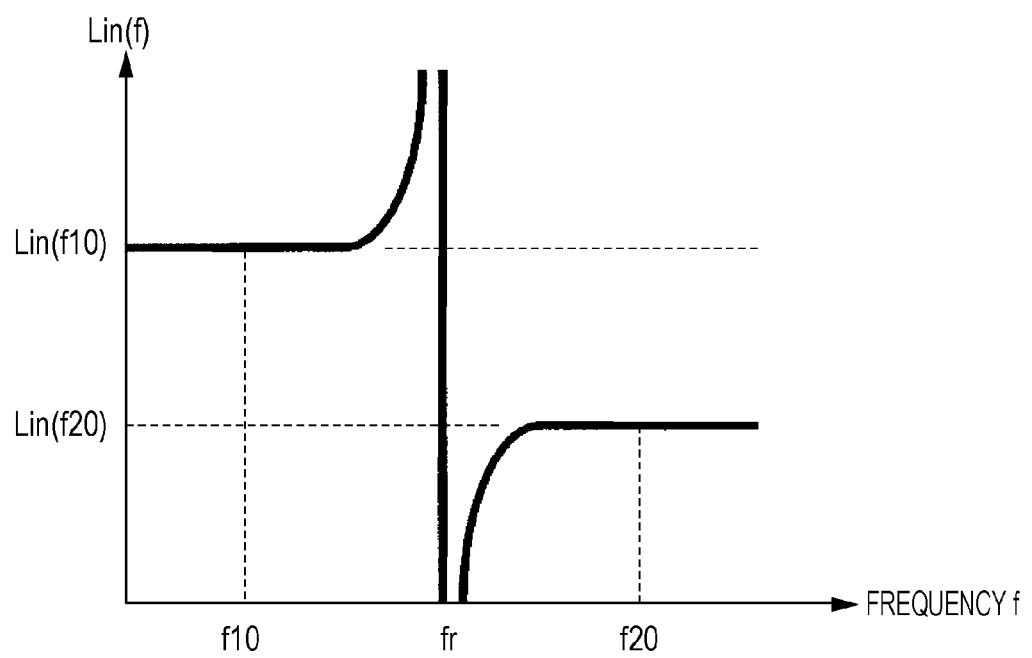
FIG. 12 is a graph illustrating frequency dependency of an input inductance of a third resonator when the third resonator and a second resonator according to the second embodiment of the present disclosure electromagnetically couple to each other.

FIG. 12 is a graph schematically illustrating expression 1.

For the frequency f≪fr, the two opposite ends of the first resonator 3 appear to be substantially open. An input inductance value measured at the frequency f10 lower than the frequency fr is indicated by Lin(f10). On the other hand, for the frequency f≫fr, the two opposite ends of the parallel capacitor in the first resonator 3 appear to be substantially short-circuited. An input inductance value measured at the frequency f20 higher than the frequency fr is indicated by Lin(f20).

When the magnitudes of f10 and f20 are appropriately set, expression 1 provides the following approximate expressions:

$$Lin(f10) \approx L3$$

$$Lin(f20) \approx L3(1-k^2)$$

These two approximate expressions provide:

$$k^2 \approx 1 - Lin(f20)/Lin(f10) \quad \text{(expression 2)}$$

According to expression 2, the coupling coefficient k can be calculated based on the ratio of Lin(f10) to Lin(f20), which are measurement values. However, expression 2 is based on a special condition with which the relationships given by expressions 3 and 4 are satisfied between an input inductance Lin_open(f) when the ends of the coil of the first resonator 3 are completely open and an input inductance Lin_short(f) when the ends of the power-receiving coil are short-circuited.

$$Lin\_open(f10) = Lin\_open(f20) \quad \text{(expression 3)}$$

$$Lin\_short(f10) = Lin\_short(f20) \quad \text{(expression 4)}$$

Stated conversely, if the wireless power-transmission system is designed using selected appropriate frequencies f10 and f20 at which expressions 3 and 4 are satisfied, then expression 2 holds, and the coupling coefficient k can be estimated. In general, as long as these frequencies f10 and f20 are set in a frequency range in which the dimensions of the resonators are sufficiently smaller than the wavelength, there is no problem in practice.

Use of a self-oscillating oscillator circuit makes it possible to directly convert changes in the input inductance into changes in the oscillation frequency. Since the input inductance is determined by the inverse of the square of the oscillation frequency, the coupling coefficient k can be re-written as:

$$k^2 \approx 1 - f10^2/f20^2 \quad \text{(expression 5)}$$

Since linear and nonlinear elements of a circuit and so on are included in practice, expressions 2 and 5 need correction, but the coupling coefficient k can, in principle, be estimated from expressions 2 and 5.

Thus, when the input inductance value or the oscillation frequency at the two frequencies f10 and f20 is measured while continuously switching between operations for oscillation at the frequencies f10 and f20, the coupling coefficient k can be estimated based on a result of the measurement. The coupling coefficient k changes according to the state of magnetic fields shielded by a metal foreign substance between the third resonator 11 and the first resonator 3. Thus, for example, when the estimated coupling coefficient k is smaller than or equal to a predetermined threshold, it can be determined that a metal foreign substance is present between the first resonator 3 and the third resonator 11.

In this case, the coupling coefficient k changes not only depending on the presence/absence of a metal foreign substance but also when the positional relationship between the first resonator 3 and the third resonator 11 changes. For example, when the wireless power-transmission system is designed so that the coupling coefficient k reaches its maximum when the central axes of both of the coils match each other, the value of the coupling coefficient k decreases when the center portions of the coils are displaced from each other. Thus, even when it is determined in the foreign-substance determination processing that no foreign substance is present, it can be thought that the position of the coil of the power-receiving side is displaced from an appropriate position when the coupling coefficient decreases to some degree, even though it is higher than the threshold. Accordingly, when the power transmission is resumed, control parameters, such as the power-transmission frequency, may be corrected considering the position displacement. This makes it possible to prevent a reduction in the power to be transmitted and a reduction in the power transmission efficiency.

Figure 13:
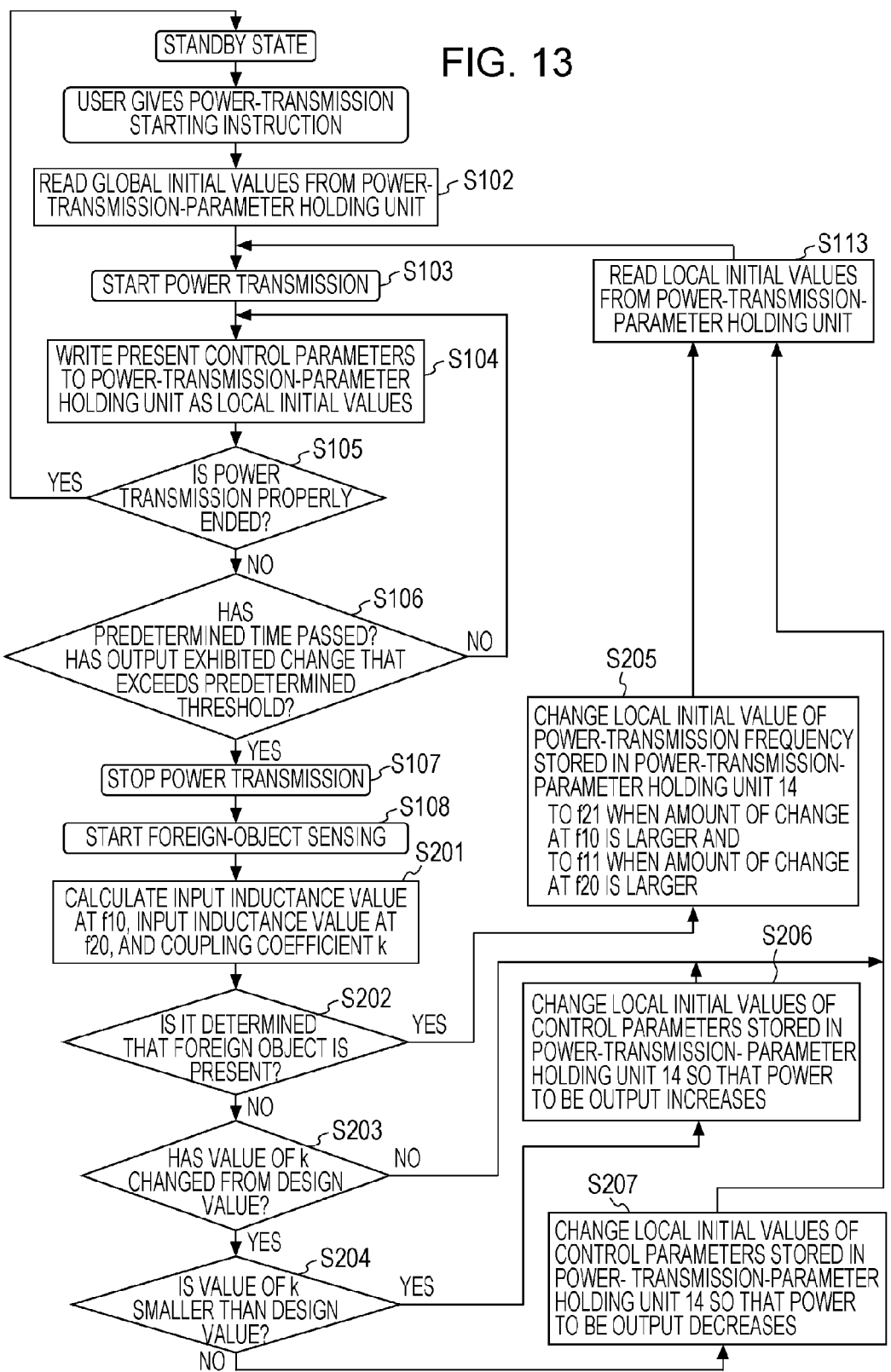
FIG. 13 is a flowchart illustrating the operation of a wireless power-transmission system according to the second embodiment of the present disclosure.

Next, overall control of the foreign-substance sensing and the power transmission on the basis of the coupling coefficient k will be described with reference to a flowchart in FIG. 13. Steps S102 to S108 and S113 in FIG. 13 are substantially the same as the corresponding steps in FIG. 9, descriptions thereof are not given hereinafter.

The foreign-substance sensing processing in the present embodiment includes, in addition to the above-described processing, step S201 in which the coupling coefficient k is determined based on the ratio of the input inductance value when the oscillator circuit 12 oscillates at the frequency f10 to the input inductance value when the oscillator circuit 12 oscillates at the frequency f20 and step S202 in which the presence/absence of a foreign substance is determined based on the coupling coefficient k. In step S202, for example, when the coupling coefficient k is smaller than or equal to a predetermined threshold, the determination circuit 44 determines that a foreign substance is present. Although not illustrated in FIG. 13, the presence/absence of a foreign substance may also be determined considering not only the coupling coefficient k but also comprehensively considering changes in other physical quantities, such as a voltage and a frequency. When it is determined that a foreign substance is present, the determination circuit 44 determines, of the input inductance value Lin(f10) at the frequency f10 and the input inductance value Lin(f20) at the frequency f20, a frequency with which the amount of change from a reference value is larger. When the amount of change is larger at f10, the local initial value of the power-transmission frequency stored in the power-transmission-parameter holding unit 14 is changed to f21. When the amount of change is larger at f20, the local initial value of the power-transmission frequency stored in the power-transmission-parameter holding unit 14 is changed to f11 (step S205). Thereafter, the power-transmission control circuit 15 reads the local initial values from the power-transmission-parameter holding unit 14 (step S113) and resumes the power transmission (step S103).

If it is determined in step S202 that no foreign substance is present, the determination circuit 44 compares the calculated coupling coefficient k with a coupling coefficient specified in the design and determines whether or not the coupling coefficient k has changed from the coupling coefficient specified in the design (step S203). In this case, if the difference between the coupling coefficient k and the coupling coefficient specified in the design (a design value) is larger than a predetermined threshold, it is determined that the coupling coefficient k has changed from the coupling coefficient specified in the design. If the coupling coefficient k has changed from the coupling coefficient specified in the design, a determination is made as to whether or not the value of the coupling coefficient k is smaller than the coupling coefficient specified in the design (step S204). If the calculated coupling coefficient k is smaller than the coupling coefficient specified in the design, the determination circuit 44 changes the local initial values stored in the power-transmission-parameter holding unit 14 so that the power to be transmitted increases (step S206). Conversely, if the calculated coupling coefficient k is larger than the coupling coefficient specified in the design, the determination circuit 44 changes the local initial values stored in the power-transmission-parameter holding unit 14 so that the power to be transmitted decreases (step S207). The power-transmission control circuit 15 resumes the power transmission by using the changed control parameters (steps S113 and S103).

The changes of the local initial values may be made, for example, by subjecting each control parameter to a computational operation using a corrected linear expression obtained by multiplying the ratio of the calculated coupling coefficient k to the coupling coefficient specified in the design by a correction coefficient. A table for control parameters with which outputs become appropriate for respective values of the coupling coefficient may be prepared so that appropriate control parameters can be determined by referring to the table.

Through the above-described processing, when it is determined that a foreign substance is present, it is possible to continue the power transmission at a frequency at which the magnetic flux density at the position where the foreign substance is thought to be present becomes low. This makes it possible to continue the power transmission while reducing heat generation of a foreign substance. On the other hand, even when it is determined that no foreign substance is present, it is possible to reduce the amount of influence due to the position displacement, when the position of the coil at the power-receiving side is displaced.

As described above, according to the present embodiment, even when a foreign substance is present in the vicinity of a coil, the heat generation of the foreign substance can be reduced, and the power transmission can be continued. In addition, even when no foreign substance is sensed, it is possible to suppress a reduction in the power transmission efficiency and a reduction in the power.

Third Embodiment

Figure 14:
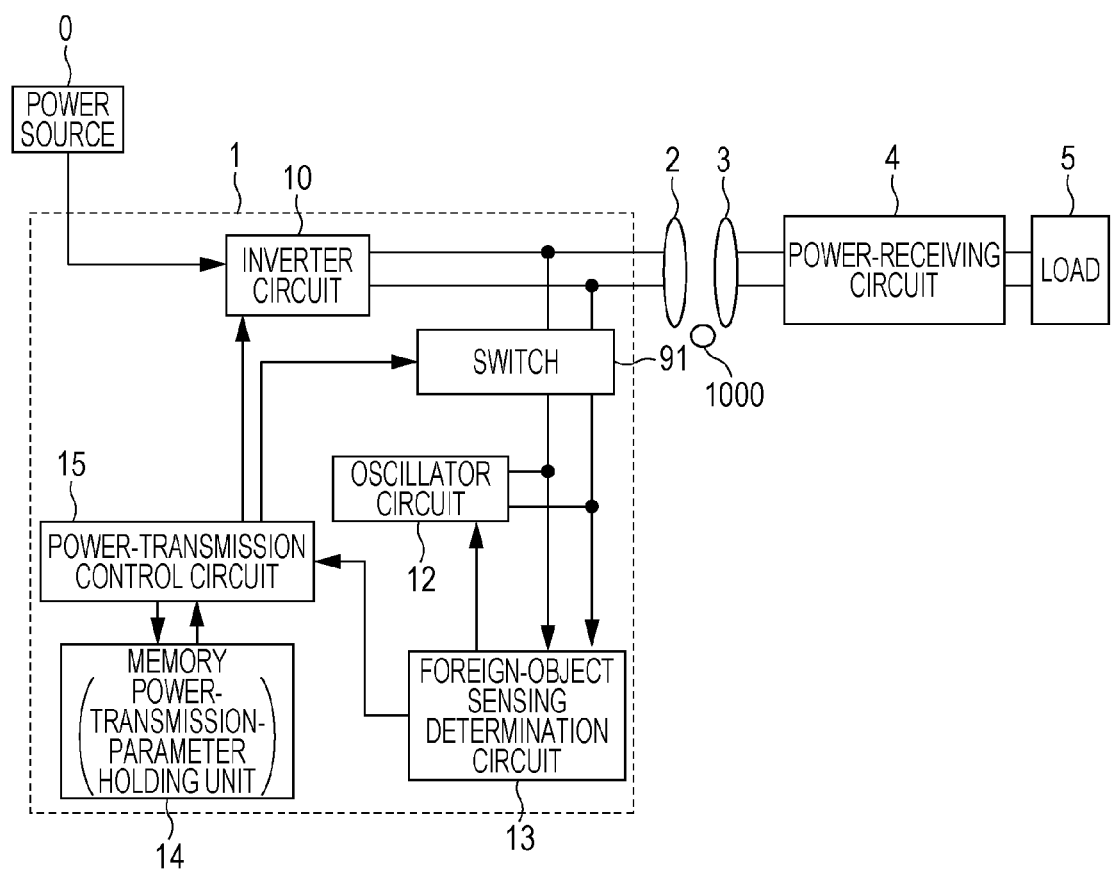
FIG. 14 is a diagram illustrating the configuration of a wireless power-transmission system according to a third embodiment of the present disclosure.

FIG. 14 is a diagram illustrating the configuration of a wireless power-transmission system according to a third embodiment of the present disclosure. The present embodiment differs from the first and second embodiments in that the second resonator 2 also has the functions of the third resonator 11. A system in which the second resonator 2 and the third resonator 11 are realized by a single resonator, like the system in the present embodiment, can also be said to have the second resonator 2 and the third resonator 11. Hereinafter, points that are different from the first or second embodiment are mainly described, and the same or similar points are not described.

The power-transmitting circuit 1 in the present embodiment has a switch 91 connected between the oscillator circuit 12 and the foreign substance detector 13 and the second resonator 2. In the foreign-substance sensing mode, the switch 91 connects the oscillator circuit 12 and the foreign substance detector 13 with the second resonator 2. In the power transmission mode, the switch 91 breaks the connections of the oscillator circuit 12 and the foreign substance detector 13 from the second resonator 2. The mode switching is performed according to an instruction signal from the power-transmission control circuit 15.

The foreign-substance sensing processing is performed according to a flow that is similar to those in the first and second embodiments. However, since the second resonator 2 has the functions of both the power transmission and the foreign-substance sensing, it is necessary to switch the resonant frequency, when the frequency used in the foreign-substance sensing is different from the power-transmission frequency. Thus, an inductor and a resonant capacitor for switching the resonant frequency can newly be connected to the second resonator 2.

Figure 15:
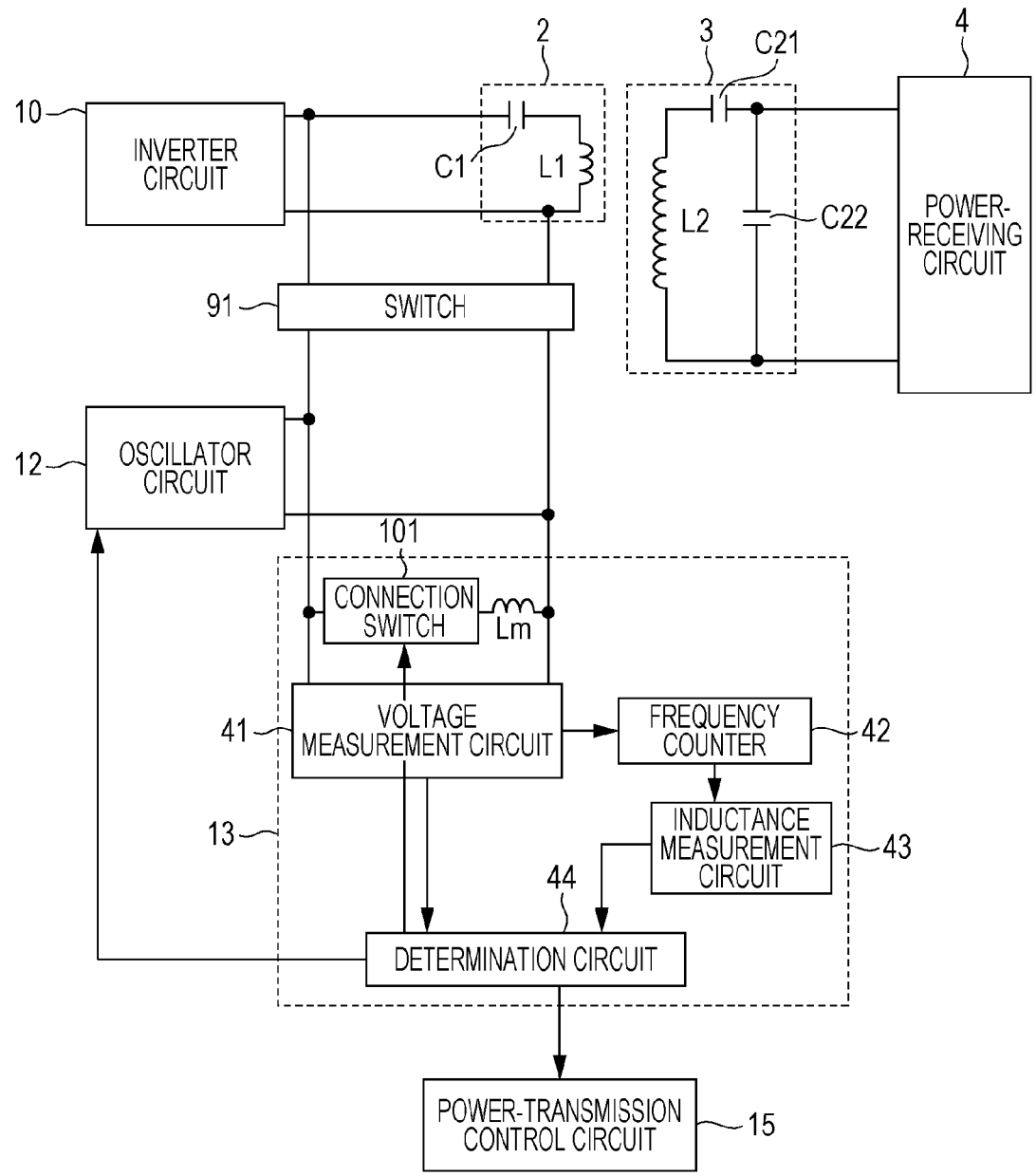
FIG. 15 is a diagram illustrating a foreign substance detector according to the third embodiment of the present disclosure.

FIG. 15 is a diagram illustrating a specific example of the configuration of the foreign substance detector 13 in the present embodiment. This foreign substance detector 13 has a connection switch 101 for connecting an inductor Lm to the second resonator 2. The inductor Lm is connected in parallel with the second resonator 2 when the connection switch 101 is in an on state. The inductance value of the inductor Lm is set so that the resonant frequency fr at which the resonant capacitor C21 in the first resonator 3 appears to be substantially short-circuited is reached when the connection switch 101 is in the on state. Thus, the second resonator 2 resonates with the first resonator 3 at a resonant frequency f0 when the connection switch 101 is in an off state and resonates with the first resonator 3 at a resonant frequency fr when the connection switch 101 is in the on state.

With such a configuration, when the foreign-substance sensing processing is performed, the switch 91 is put into a connected state, and a method that is similar to that of the first or second embodiment described above can be used. For example, the presence/absence of a metal foreign substance can be determined based on the input inductance value Lin(f10) of the second resonator 2 when the connection switch 101 is put into the off state and the oscillator circuit 12 oscillates at the frequency f10 lower than the frequency fr and the input inductance value Lin(f20) viewed from the second resonator 2 when the connection switch 101 is put into the state and the oscillator circuit 12 oscillates at the frequency f20 higher than the frequency fr. Although the configuration of the present embodiment is a configuration in which the inductor Lm can be added in order to switch the frequency, it may be another configuration. For example, the configuration may be a configuration in which a resonant capacitor can be added or a configuration in which both an inductor and a resonant capacitor can be added.

In the configuration illustrated in FIG. 15, when a foreign substance is to be sensed based on the coupling coefficient k, expression 6 obtained by correcting expression 5 can be used.

$$k \approx 1 - f10^2/(f20^2 - f30^2) \qquad \text{(expression 6)}$$

In this case, a frequency f30 is an oscillation frequency when the switch 91 is turned off and the connection switch 101 is turned on. That is, measuring the frequency f30 is equivalent to measuring the inductance value of the adjustment inductor Lm. When the oscillator circuit 12 oscillates at the frequency f20, the oscillation frequency includes components based on the input inductance value of the coil L1 and components based on the inductance value of the adjustment inductor Lm. Thus, in the denominator of the second term of expression 6, a coupling coefficient after the influence of the adjustment inductor Lm is eliminated is calculated. Thus, a foreign substance may be detected based on the coupling coefficient k calculated using correction expression 6 based on expression 5, instead of using expression 5. Since various types of circuit topology are available for a self-oscillating LC oscillator circuit, the correction expression is not limited to expression 6. For example, there is a circuit topology adapted to change the oscillation frequency by switching the resonant capacitors Cx and Cy illustrated in FIG. 8 to different capacitors. Even when a different circuit topology is employed, it is easy to derive correction expression of expression 5. Similarly, when expression 2 is used, the coupling coefficient k may be calculated using a correction expression obtained by correcting expression 2 in accordance with the circuit topology.

According to the present embodiment, since the coil for power transmission and the coil for foreign-substance sensing can be integrated together, it is possible to miniaturize devices. Even when a foreign substance is present in the vicinity of the coil, it is possible to continue the power transmission with reduced heat generation, and when no metal foreign substance is present, it is possible to suppress a reduction in the power transmission efficiency and a reduction in the power.

Fourth Embodiment

Figure 16:
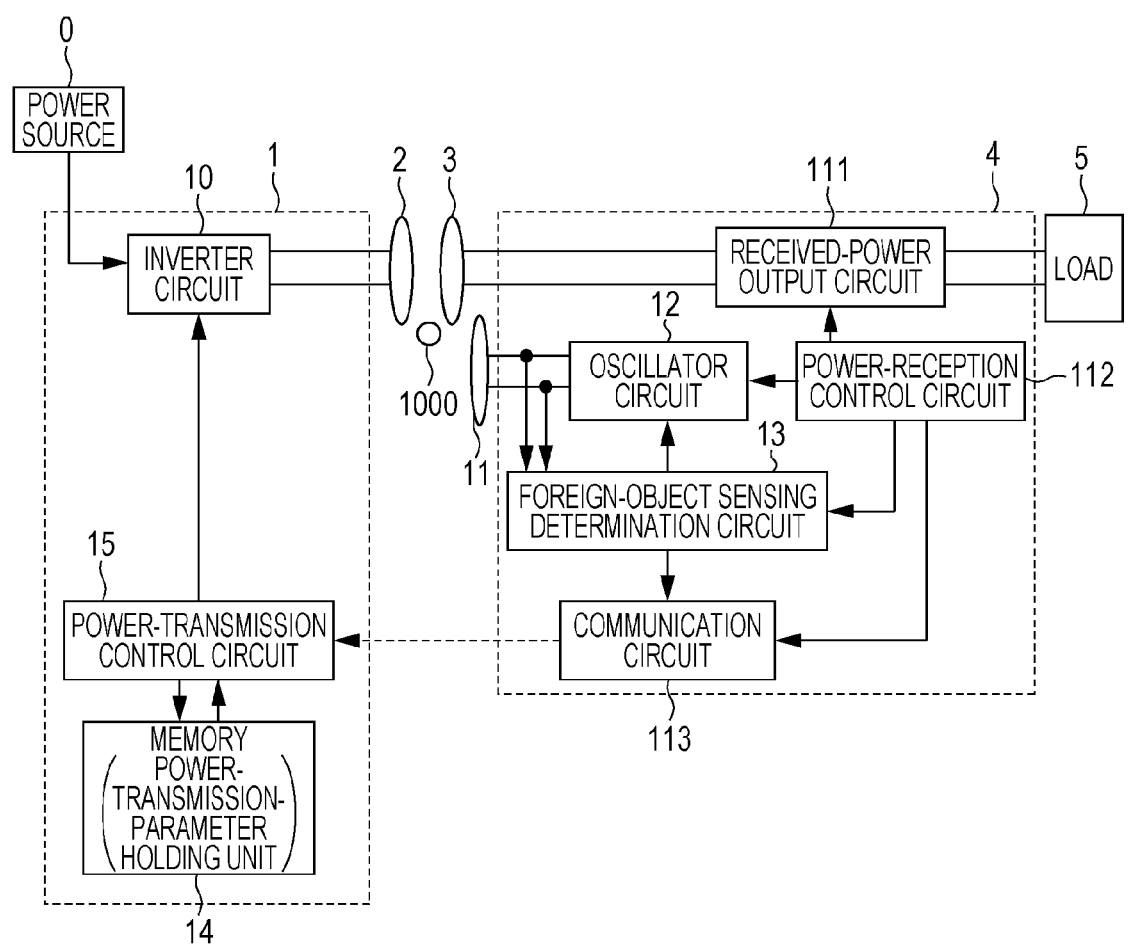
FIG. 16 is a diagram illustrating the configuration of a wireless power-transmission system according to a fourth embodiment of the present disclosure.

FIG. 16 is a diagram illustrating the configuration of a wireless power-transmission system according to a fourth embodiment of the present disclosure. The present embodiment differs from the first, second, and third embodiments in that constituent elements for detecting a foreign substance are provided in the power-receiving circuit 4, not in the power-transmitting circuit 1. Hereinafter, points that are different from the first, second, and third embodiments are mainly described, and descriptions of the same or similar points are not given.

In the present embodiment, the third resonator 11, the oscillator circuit 12, and the foreign substance detector 13 that are configured to detect a foreign substance are provided in the power-receiving circuit 4. In addition, the second resonator 2, not the first resonator 3, has a parallel resonant capacitor. During foreign-substance sensing processing, in a state in which the second resonator 2 and the third resonator 11 electromagnetically couple to each other, the foreign substance detector 13 determines the presence/absence of a metal foreign substance on the basis of changes in the input impedance of the third resonator 11. The resonant frequency of the second resonator 2 and the third resonator 11 are set to fr. The parallel resonant capacitor in the second resonator 2 is set to have a value at which it is substantially open at the frequency of the power transmission.

There are cases in which the size of a power-receiving-side device is larger than the size of a power-transmitting-side device. For example, there are cases in which a large-size power-receiving-side device, such as a tablet terminal, is charged using a small-size power-transmitting-side device. In such cases, when the power-transmitting-side device uses a display element for reporting the presence of a foreign substance, the display element is hidden by the power-receiving-side device, thus making it difficult to check the presence/absence of a foreign substance. This problem can be overcome by using a configuration in which the power-receiving-side device makes the foreign-substance determination and the result of the determination is displayed on the display element of the power-receiving-side device to notify the user.

The power-receiving circuit 4 has a received-power output circuit 111 and a power-reception control circuit 112. The received-power output circuit 111 may include various types of circuit, such as a rectifier circuit, a frequency conversion circuit, and a constant-voltage/constant-current control circuit. The received-power output circuit 111 converts received AC energy into DC energy that can be used by a load 230 or into low-frequency AC energy. The power-reception control circuit 112 is a circuit that controls the overall operation of the power-receiving circuit 4.

A description will be given of the operation of the foreign-substance sensing processing in the present embodiment. The processing until the foreign-substance sensing processing is started is analogous to the processing in the first embodiment described above. Now, a description will be given of processing for starting the foreign-substance sensing processing.

When the foreign-substance sensing processing is to be started, the power-transmission control circuit 15 stops the power transmission performed by the inverter circuit 10, as in the first embodiment. The power transmission is stopped when a stopping signal is sent from the power-reception control circuit 112 to the power-transmission control circuit 15 via the communication circuit 113. The stopping signal from the power-reception control circuit 112 is also sent to the received-power output circuit 111. The received-power output circuit 111 switches an output circuit so that the output impedance is substantially open. For example, when the received-power output circuit 111 is a synchronous rectification circuit constituted by switching elements, all of the switching elements are put into an off state. Alternatively, the power-receiving circuit 4 may be configured so as to switch an output end to a high-impedance resistor circuit.

After the switching, the power-reception control circuit 112 sends a signal to the oscillator circuit 12 to cause the oscillator circuit 12 to oscillate at the frequencies f10 and f20. During the oscillation, the foreign substance detector 13 measures the oscillation frequency of the third resonator 11. The presence/absence of a foreign substance is determined based on the input impedance of the third resonator 11, the input impedance being determined according to the measured oscillation frequency. Next, the foreign substance detector 13 sends information indicating the determination result to the power-transmission control circuit 15 via the communication circuit 113. As in the first embodiment, the power-transmission control circuit 15 changes the local initial values, held in the power-transmission-parameter holding unit 14, in accordance with the determination result and starts the power transmission.

According to the present embodiment, whether or not a foreign substance is present can be reported to the user via a display element (such as a display or a lamp) included in the power-receiving-side device. In addition, even when a foreign substance is present in the vicinity of the coil, it is possible to continue the power transmission with reduced heat generation. When no foreign substance is present, it is also possible to suppress a reduction in the power transmission efficiency and a reduction in the power. The configuration in the present embodiment is not limited to a case in which the size of the power-receiving-side device is larger than the size of the power-transmitting-side device, and is also applicable to a case in which the size of the power-receiving-side device is smaller than the size of the power-transmitting-side device.

The embodiments disclosed herein are exemplary and illustrative in all respects and are not intended to be limiting. It is to be understood that the scope of the present disclosure is determined by the scope of the appended claims, not by the above description, and is intended to encompass all aspects including changes and modifications within meanings and a scope equivalent to the claims.

The present disclosure includes a wireless power-transmission system having a power transmission apparatus and a power transmission apparatus described in the following items.

[Item 1] A power transmission device that transmits first AC power in a noncontact manner to a first resonator of a power receiving device including a power receiving circuit, the first resonator receiving the first AC power, the power receiving circuit converting the first AC power received by the first resonator to first DC power and supplying the first DC power to a load, the power transmission device comprising:

a memory that stores a requested voltage value of the first DC power supplied to the load;

a receiving circuit that receives, from the power receiving device, an actual voltage value of the first DC power supplied to the load;

an inverter that generates and transmits the first AC power to the first resonator via a second resonator;

an oscillator that generates second AC power smaller than the first AC power and transmits the second AC power to the first resonator via a third resonator;

a foreign substance detector that determines whether or not a foreign substance is present between the first resonator and the third resonator based on a physical quantity in the third resonator that changes according to the second AC power; and power transmission control circuitry operative to:

set a foreign substance detection period in which foreign substance is detected by the foreign substance detector, between i) a first power transmission period in which the first AC power is transmitted from the second resonator to the first resonator and ii) a second power transmission period subsequent to the first power transmission period;

set sequentially to the inverter, in the first power transmission period, frequencies i) from a frequency f1 of a power transmission voltage in an initial state ii) to a frequency f2 of the requested voltage;

cause the inverter to transmit the first AC power at each of the set frequencies;

compare the requested voltage value with the actual voltage value of each of the frequencies, received by the receiving circuit;

store a value indicating a frequency f0 of the actual voltage value in the memory if the actual voltage value equals to the requested voltage value;

cause the inverter to transmit the first AC power at the frequency f0 if the actual voltage value equals to the requested voltage value;

cause the inverter to stop the first AC power temporarily after the elapse of a predetermined period of time;

cause the foreign substance detector to determine whether or not the foreign substance is present in the foreign substance detection period; and cause the inverter to resume a transmission of the first AC power in the second power transmission period by the value indicating the frequency f0 in the memory if it is determined that the foreign substance is not present within a predetermined period that starts from the stopping of the first AC power and that is regulated to cause the inverter to resume a transmission of the first AC power from the frequency f1.

In this aspect, in the first power transmission period, frequencies from the frequency f1 corresponding to the power transmission voltage in the initial state to the frequency f2 corresponding to the requested voltage are sequentially set for the inverter circuit, and the first AC power is transmitted by using each of the set frequencies.

In addition, the receiving circuit is used to receive the actual voltage value corresponding to each of the frequencies, the requested voltage value is compared with the actual voltage value corresponding to each of the frequencies, the value indicating the frequency f0 corresponding to the actual voltage value that matches the requested voltage value is held in the memory, and then the first AC power is transmitted by using the frequency f0.

In the foreign-substance sensing period, the power transmission is temporarily stopped to bring about a power-transmission stopping state, and the foreign substance detector is used to determine whether or not a foreign substance is present.

When it is determined that no foreign substance is present, the value indicating the frequency f0, the value being held in the memory, is used to resume, from the power-transmission stopping state, the power transmission of the first AC power in the second power transmission period, for example, within the predetermined time for which the Qi standard specifies that the power transmission is to be resumed at the frequency f1 corresponding to the power transmission voltage in the initial state.

Through use of the value indicating the frequency f0, the value being held in the memory, the voltage is not returned to the power transmission voltage in the initial state. Thus, it is possible to reduce the period of time until the voltage reaches from the power transmission voltage in the initial state to the requested voltage, and it is possible to reach the requested voltage value before the predetermined time. Hence, it is possible to provide a power transmission apparatus that performs highly efficient power transmission by reducing the power-transmission stopping time from when the power transmission is temporarily stopped until the power transmission is resumed.

[Item 2] In the power transmission apparatus according to item 1, the frequency f1 may be higher than the frequency f2.

According to this aspect, the power transmission is started at the frequency f1 that is higher than a resonant frequency of the first resonator and the second resonator.

[Item 3] In the power transmission apparatus according to item 1, the frequency f1 may be lower than the frequency f2.

According to this aspect, the power transmission is started at the frequency f1 that is lower than a resonant frequency of the first resonator and the second resonator.

[Item 4] In the power transmission apparatus according to one of items 1 to 3, when it is determined that no foreign substance is present after the predetermined period, the power-transmission control circuit may resume the power transmission at the frequency f1 in the second power transmission period.

According to this aspect, when it is determined that no foreign substance is present after the predetermined period, in the second power transmission period, the power-transmission control circuit causes the power transmission to be resumed at the frequency f1 with which the power transmission voltage is a low voltage.

[Item 5] In the power transmission apparatus according to one of items 1 to 4, the predetermined period is 350 milliseconds specified in a Qi standard of a wireless power consortium (WPC).

According to this aspect, since the predetermined time that complies with the Qi standard is used for the operation, it is possible to provide a highly safe power transmission apparatus.

[Item 6] In the power transmission apparatus according to one of items 1 to 5, in the first power transmission period, the power-transmission control circuit may hold, in the memory, a value indicating a duty ratio of a voltage output from the inverter circuit, in addition to the value indicating the frequency f0, and then may cause the first AC power to be transmitted by using the frequency f0; and in the second power transmission period, the power-transmission control circuit may cause the power transmission of the first AC power to be resumed by using the value indicating the frequency f0 and the value indicating the duty ratio, the values being held in the memory.

According to this aspect, in the first power transmission period, the frequency f0 and the duty ratio of the voltage output from the inverter circuit are adjusted, the power transmission voltage is made to match the requested voltage value, and the power transmission is performed with higher efficiency. The value indicating the frequency f0 and the value indicating the duty ratio are then held in the memory.

In the second power transmission period, the value indicating the frequency f0 and the value indicating the duty ratio, the values being held in the memory, are used, so that the power transmission voltage matches the requested voltage value, thereby making it possible to perform power transmission with higher efficiency.

[Item 7] In the power transmission apparatus according to one of items 1 to 6, the foreign substance detector may measure the physical quantity in the third resonator, the physical quantity changing according to the second AC power, and when a difference between the measured physical quantity and a predetermined reference value exceeds a predetermined range, the foreign substance detector may determine that a foreign substance is present between the first resonator and the third resonator.

According to this aspect, the physical quantity in the third resonator is measured, and when the difference between the measured physical quantity and the predetermined reference value becomes large and exceeds an upper limit of the predetermined range, it can be determined that a foreign substance is present between the first resonator and the third resonator. On the other hand, when the difference becomes small and falls below a lower limit of the predetermined range, it can be determined that a foreign substance is present between the first resonator and the third resonator.

[Item 8] In the power transmission apparatus according to one of items 1 to 7, the foreign substance detector may measure the physical quantity in the third resonator, and may determine whether or not a foreign substance is present, based on a value calculated from the measured physical quantity.

According to this aspect, the physical quantity in the third resonator is measured, and a determination as to whether or not a foreign substance is present is made based on the value calculated from the measured physical quantity.

For example, the determination as to whether or not a foreign substance is present is made based on an expression that allows the foreign-substance determination to be performed with high accuracy.

For example, according to the method for making the determination, when the difference between the calculated value and the reference value exceeds the predetermined range, it is determined that a foreign substance is present between the first resonator and the third resonator. When the difference becomes large and exceeds an upper limit of the predetermined range, it can be determined that a foreign substance is present between the first resonator and the third resonator. On the other hand, when the difference becomes small and falls below a lower limit of the predetermined range, it can be determined that a foreign substance is present between the first resonator and the third resonator.

Thus, the determination as to whether or not a foreign substance is present between the first resonator and the third resonator can be made with high accuracy.

[Item 9] In the power transmission apparatus according to one of items 1 to 8, the physical quantity in the third resonator is i) a voltage that is applied to the third resonator, ii) a current that flows in the third resonator, iii) a frequency that is applied to the third resonator, iv) an input impedance value of the third resonator, or v) an input inductance value of the third resonator.

According to this aspect, measuring the physical quantity makes it possible to easily determine whether or not a foreign substance is present between the first resonator and the third resonator.

[Item 10] In the power transmission apparatus according to one of items 1 to 9, the first resonator has a parallel resonant circuit including a coil and a capacitor, and if the physical quantity in the third resonator is an input inductance of the third resonator, the foreign substance detector is operative to;

measure i) an input inductance value $Lin(f10)$ of the third resonator that is produced when the oscillator is oscillating at the frequency f10 and ii) an input inductance value $Lin(f20)$ of the third resonator that is produced when the oscillator is oscillating at the frequency f20;

calculate a coupling coefficient k according to an expression $k^2=1-Lin(f20)/Lin(f10)$: and determine whether or not the foreign substance is present based on the calculated coupling coefficient k.

According to this aspect, the coupling coefficient k is calculated by using the expression $k^2=1-Lin(f20)/Lin(f10)$, and the determination as to whether or not a foreign substance is present is made based on the calculated coupling coefficient k.

When the input inductance value of the third resonator when two opposite ends of the coil are short-circuited is used for $Lin(f20)$ and the input inductance value of the third resonator when the two opposite ends of the coil are open is used for $Lin(f10)$, the coupling coefficient k that is highly accurate can be calculated, and the determination as to whether or not a foreign substance is present can be made with high accuracy.

The parallel resonant circuit including the coil and the capacitor provided for two opposite ends of coil is provided in the power receiving apparatus. With this arrangement, when the oscillator circuit performs driving at the frequency f10 lower than second resonant frequency fr, no current flows to the capacitor to thereby make it possible to create a state in which the two opposite ends of the coil are substantially open. Also, when the oscillator circuit performs driving at the frequency f20 higher than the second resonant frequency fr, current flows to the capacitor to thereby make it possible to create a state in which the two opposite ends of the coil are short-circuited.

Hence, by providing only the capacitor for the two opposite ends of the coil, it is possible to create a state in which the two opposite ends of the coil are substantially open and a state in which the two opposite ends of the coil are short-circuited. Accordingly, unlike processing that is typically performed, a short-circuiting switch does not need to be provided for the two opposite ends of the coil, and a control circuit for controlling the short-circuiting switch does not need to be provided in the power receiving apparatus. Thus, unlike processing that is typically performed, it is possible to eliminate the burden of sending a signal from the power transmission apparatus to control the short-circuiting switch. As a result, since the foreign-substance sensing is performed using the coupling coefficient that is highly accurate, the foreign-substance sensing can be performed with a simple configuration and with high accuracy even when the load varies, without causing an increase in cost.

[Item 11] In the power transmission apparatus according to one of items 1 to 10, the first resonator has a parallel resonant circuit including a coil and a capacitor, and if the physical quantity in the third resonator is an input inductance value of the third resonator, the foreign substance detector is operative to:

measure i) an input inductance value $Lin(f10)$ of the third resonator that is produced when the oscillator is oscillating at the frequency f10 and ii) an input inductance value $Lin(f20)$ of the third resonator that is produced when the oscillator is oscillating at the frequency f20;

calculate a ratio between the $Lin(f10)$ and the $Lin(f20)$; and determine whether or not the foreign substance is present based on the calculated ratio.

According to this aspect, the ratio of the measured input inductance values $Lin(f10)$ to $Lin(f20)$ is calculated, and a determination as to whether or not a foreign substance is present is made based on the calculated ratio.

Now, a description will be given of the meaning of the expression "based on the ratio of the input inductance value $Lin(f10)$ to the input inductance value $Lin(f20)$".

Expression 1 "$k^2=1-Lin(f2)/Lin(f1)$" that calculates the coupling coefficient k can be changed to expression 2 "$Lin(f2)/Lin(f1)=1-k^2$". Thus, when $Lin(f2)/Lin(f1)$ is determined, the coupling coefficient k can be uniquely determined. Accordingly, a determination as to whether or not a foreign substance is present between the first resonator and the third resonator can be made based on the ratio of the input inductance value Lin(f1) to the input inductance value Lin(f2).

Calculating the coupling coefficient k by using expression 1 involves square-root calculation processing other than four arithmetic operations. On the other hand, since the ratio of the input inductance value Lin(f1) to the input inductance value Lin(f2) is simple division, the processing load can be reduced, and the calculation speed can also be increased.

In addition, as in the aspect described above, it is not necessary to provide a short-circuiting switch for two opposite ends of the coil, and it is possible to eliminate the burden of sending a signal from the power transmission apparatus to control the short-circuiting switch.

[Item 12] In the power transmission apparatus according to one of items 1 to 11, the first resonator has a parallel resonance circuit including a coil and a capacitor, the square of an oscillation frequency of the oscillator is inversely proportional to the input inductance value of the third resonator, when the oscillator is a self-exciting oscillator and when the physical quantity in the third resonator is an input inductance value of the third resonator, and the foreign substance detector is operative to:

measure the frequency f10 and the frequency f20 at which the oscillator is oscillating;

calculate a coupling coefficient k according to an expression $k^2=1-f1^2/f2^2$; and determine whether or not a foreign substance is present based on the calculated coupling coefficient k.

According to this aspect, when the oscillator circuit is a self-oscillating oscillator circuit and is based on an LC resonance principle, a frequency f of the self-oscillating oscillator circuit can be given by expression $f=1/(2\pi \times (LC)^{(1/2)})$, where L indicates the input inductance value, and C indicates the capacitor. Since the capacitance C is a known circuit constant, the input inductance value L is inversely proportional to the square of the frequency of the oscillator circuit. Thus, $k^2=1-Lin(f2)/Lin(f1)$, which is an expression for the coupling coefficient, can be replaced with $k^2=1-f1^2/f2^2$.

This can eliminate the need for a process in which the measurement circuit measures the input inductance, and it is sufficient to use the values of the frequencies f1 and f2 at which the oscillator circuit oscillates. Thus, the measurement circuit does not need to measure the input inductance, thus making it possible to calculate the coupling coefficient with high accuracy. The values of the frequency f1 and the frequency f2 may be values of the frequency f1 and the frequency f2 of the measurement circuit which are measured by the first resonator. Also, the same concept can also be applied to another oscillator circuit, and those skilled in the art can easily conceive such an application.

In addition, as in the aspect described above, it is not necessary to provide a short-circuiting switch for two opposite ends of the coil, and it is possible to eliminate the burden of sending a signal from the power transmission apparatus to control the short-circuiting switch.

[Item 13] In the power transmission apparatus according to one of items 1 to 12, the first resonator and the third resonator are the same resonator, and the power transmission device further comprises a switch that switches between i) a first electrical connection between the inverter and the same resonator, and ii) a second electrical connection between the oscillator and the same resonator, by the power transmission control circuitry, wherein the power transmission control circuitry is operative to:

control the switch to switch from the first electrical connection to the second electrical connection when changing from the first power transmission period to the foreign substance detection period; and control the switch to switch from the second electrical connection to the first electrical connection when changing from the foreign substance detection period to the second power transmission period.

According to this aspect, since the second resonator and the third resonator are constituted by a single resonator, the resonator that transmits the first AC power to the second resonator and the resonator that transmits the second AC power to the second resonator become the same resonator, thus making it possible to reduce the component count. It is also possible to miniaturize the power transmission apparatus.

[Item 14] A wireless power-transmission system includes: the power transmission apparatus according to one of items 1 to 13; and a power receiving apparatus.

A power transmission apparatus, a power receiving apparatus, and a wireless power-transmission system having the power transmission apparatus and the power receiving apparatus according to another aspect of the present disclosure have the following configurations.

(1) A wireless power-transmission system according to one aspect of the present disclosure includes: a power-transmitting circuit that converts input DC energy into AC energy and outputs the AC energy; a first resonator that resonates at a frequency f0 and that sends the AC energy output from the power-transmitting circuit; a second resonator that resonates at the frequency f0 and a frequency fr and that receives at least part of the AC energy sent from the first resonator through electromagnetic coupling with the first resonator; a power-receiving circuit that converts the AC energy received by the second resonator into DC energy and supplies the converted DC energy to a load; and a third resonator that resonates at the frequency fr and that electromagnetically couples with the second resonator. The power-transmitting circuit includes: an inverter circuit that has a plurality of switches and that converts input DC energy into AC energy via switching of the plurality of switches and outputs the AC energy to the first resonator; a power-transmission control circuit that controls the switching of the plurality of switches in the inverter circuit; an oscillator circuit that is connected to the third resonator and that can oscillate at at least one of a frequency f10 lower than the frequency fr and a frequency f20 higher than the frequency fr; a measurement circuit that measures a physical quantity that changes according to a voltage output from the oscillator circuit; and a determination circuit that instructs the power-transmission control circuit so as to transmit power at a frequency f21 higher than the frequency f0, when the oscillator circuit oscillates at the frequency f10 and an amount of change in the measured physical quantity from a reference value is larger than a pre-set threshold, and that instructs the power-transmission control circuit so as to transmit power at a frequency f11 lower than the frequency f0, when the oscillator circuit oscillates at the frequency f20 and the amount of change in the measured physical quantity from the reference value is larger than the pre-set threshold.

(2) In one embodiment, the oscillation control circuit causes the oscillator circuit to oscillate at both of the frequencies f10 and f20; and when the amount of change in the physical quantity from the reference value when the oscillator circuit oscillates at the frequency f10 is larger than the threshold and is larger than the amount of change in the physical quantity from the reference value when the oscillator circuit oscillates at the frequency f20, the determination circuit instructs the power-transmission control circuit so as to transmit power at the frequency f21, and when the amount of change in the physical quantity from the reference value when the oscillator circuit oscillates at the frequency f20 is larger than the threshold and is larger than the amount of change in the physical quantity from the reference value when the oscillator circuit oscillates at the frequency f10, the determination circuit instructs the power-transmission control circuit so as to transmit power at the frequency f11.

(3) In one embodiment, when an amount of change in the physical quantity from the reference value when the oscillator circuit oscillates at least one of the frequencies f10 and f20 is larger than the threshold, the determination circuit outputs information indicating that a foreign substance comes close to the third resonator or the second resonator.

(4) In one embodiment, the determination circuit determines the presence/absence of a foreign substance, based on a ratio of an input inductance value Lin(f10) of the third resonator when the oscillator circuit oscillates at a frequency f10 lower than a frequency fr to an input inductance value Lin(f20) of the third resonator when the oscillator circuit oscillates at a frequency f20 higher than the frequency fr.

(5) In one embodiment, the determination circuit determines the presence/absence of a foreign substance on the basis of a coupling coefficient k calculated using an expression $k^2=1-\text{Lin}(f20)/\text{Lin}(f10)$ or a corrected expression based on the expression.

(6) In one embodiment, the oscillator circuit is a self-oscillating oscillator circuit and is configured so that the input inductance value of the third resonator is inversely proportional to the square of an oscillation frequency of the oscillator circuit, and the determination circuit determines the presence/absence of a foreign substance on the basis of a coupling coefficient k calculated using an expression $k^2=1-f1^2/f2^2$ or a corrected expression based on the expression.

(7) In one embodiment, the first resonator and the third resonator are constituted by one resonator. The wireless power-transmission system further includes a switch connected between the oscillator circuit and the resonator and a control circuit that turns on the switch in a foreign-substance sensing mode and turns off the switch in a power transmission mode.

(8) A wireless power-transmission system according to another aspect of the present disclosure includes: a power-transmitting circuit that converts input DC energy into AC energy and outputs the AC energy; a first resonator that resonates at a frequency f0 and that sends the AC energy output from the power-transmitting circuit; a second resonator that resonates at the frequency f0 and a frequency fr and that receives at least part of the AC energy sent from the first resonator through electromagnetic coupling with the first resonator; a power-receiving circuit that converts the AC energy received by the second resonator into DC energy and supplies the converted DC energy to a load; and a third resonator that resonates at the frequency fr and that electromagnetically couples with the second resonator. The power-transmitting circuit includes: an inverter circuit that has a plurality of switches and that converts input DC energy into AC energy via switching of the plurality of switches and outputs the AC energy to the first resonator; an oscillator circuit that is connected to the third resonator and that outputs a voltage including an AC component; a measurement circuit that measures a physical quantity that changes according to the voltage output from the oscillator circuit; a determination circuit that determines the presence/absence of a foreign substance on the basis of an amount of change in the measured physical quantity from a reference value; and a power-transmission control circuit that controls at least one of a frequency of a voltage output from the inverter circuit and a duty ratio of the voltage during power transmission, that records a control parameter regarding at least one of the frequency and the duty ratio to a memory, and that controls, when the power transmission is resumed after the determination circuit performs the determination processing, the inverter circuit by using the control parameter determined based on a result of the determination processing.

(9) In one embodiment, when the determination circuit does not detect a foreign substance, the power-transmission control circuit controls the inverter circuit by using the control parameter recorded in the memory.

(10) In one embodiment, upon determining that a foreign substance is present when the oscillator circuit oscillates at the frequency f10 lower than the frequency fr, the determination circuit instructs the power-transmission control circuit so as to transmit power at the frequency f21 higher than the frequency f0.

(11) In one embodiment, upon determining that a foreign substance is present when the oscillator circuit oscillates at the frequency f20 higher than the frequency fr, the determination circuit instructs the power-transmission control circuit so as to transmit power at the frequency f11 lower than the frequency f0.

(12) In one embodiment, when the oscillator circuit oscillates at the frequency f10, and an amount of change in the measured physical quantity from a reference value is larger than a pre-set threshold, the determination circuit instructs the power-transmission control circuit so as to transmit power at the frequency f21 higher than the frequency f0, and when the oscillator circuit oscillates at the frequency f20, and the amount of change in the measured physical quantity from the reference value is larger than the pre-set threshold, the determination circuit instructs the power-transmission control circuit so as to transmit power at the frequency f11 lower than the frequency f0.

(13) In one embodiment, the determination circuit determines the presence/absence of a foreign substance, based on an input inductance value of the third resonator when the oscillator circuit oscillates.

(14) In one embodiment, the determination circuit determines the presence/absence of a foreign substance, based on a ratio of an input inductance value Lin(f10) of the third resonator when the oscillator circuit oscillates at a frequency f10 lower than a frequency fr to an input inductance value Lin(f20) of the third resonator when the oscillator circuit oscillates at a frequency f20 higher than the frequency fr.

(15) In one embodiment, the determination circuit determines the presence/absence of a foreign substance on the basis of a coupling coefficient k calculated using an expression $k^2=1-\text{Lin}(f20)/\text{Lin}(f10)$ or a corrected expression based on the expression.

(16) In one embodiment, the oscillator circuit is a self-oscillating oscillator circuit and is configured so that the input inductance value of the third resonator is inversely proportional to the square of an oscillation frequency of the oscillator circuit, and the determination circuit determines the presence/absence of a foreign substance on the basis of a coupling coefficient k calculated using an expression $k^2=1-f1^2/f2^2$ or a corrected expression based on the expression.

(17) In one embodiment, when the determination circuit determines that no foreign substance is present, and a difference between the coupling coefficient k and a design value is larger than or equal to a predetermined threshold, the power-transmission control circuit starts power transmission by using a control parameter obtained by correcting the control parameter recorded in the memory.

(18) In one embodiment, the first resonator and the third resonator are constituted by one resonator. The power transmission apparatus further includes a switch connected between the oscillator circuit and the resonator and a control circuit that turns on the switch in a foreign-substance sensing mode and turns off the switch in a power transmission mode.

(19) A power transmission apparatus according to another aspect of the present disclosure includes: a power-transmitting circuit that converts input DC energy into AC energy and outputs the AC energy; a first resonator that resonates at a frequency f0 and that sends the AC energy output from the power-transmitting circuit; and a third resonator that resonates at a frequency fr and electromagnetically couples with a second resonator included in the power receiving apparatus. The power-transmitting circuit includes: an inverter circuit that has a plurality of switches and that converts input DC energy into AC energy via switching of the plurality of switches and outputs the AC energy to the first resonator; a power-transmission control circuit that controls the switching of the plurality of switches in the inverter circuit; an oscillator circuit that is connected to the third resonator and that can oscillate at at least one of a frequency f10 lower than the frequency fr and a frequency f20 higher than the frequency fr; a measurement circuit that measures a physical quantity that changes according to a voltage output from the oscillator circuit; and a determination circuit that instructs the power-transmission control circuit so as to transmit power at a frequency f21 higher than the frequency f0, when the oscillator circuit oscillates at the frequency f10 and an amount of change in the measured physical quantity from a reference value is larger than a pre-set threshold, and that instructs the power-transmission control circuit so as to transmit power at a frequency f11 lower than the frequency f0, when the oscillator circuit oscillates at the frequency f20 and the amount of change in the measured physical quantity from the reference value is larger than the pre-set threshold.

(20) A power transmission apparatus according to another aspect of the present disclosure includes: a power-transmitting circuit that converts input DC energy into AC energy and outputs the AC energy, a first resonator that resonates at a frequency f0 and that sends the AC energy output from the power-transmitting circuit, and a third resonator that resonates at a frequency fr and electromagnetically couples with a second resonator included in the power receiving apparatus. The power-transmitting circuit includes: an inverter circuit that has a plurality of switches and that converts input DC energy into AC energy via switching of the plurality of switches and outputs the AC energy to the first resonator; an oscillator circuit that is connected to the third resonator and that outputs a voltage including an AC component; a measurement circuit that measures a physical quantity that changes according to the voltage output from the oscillator circuit; a determination circuit that determines the presence/absence of a foreign substance on the basis of an amount of change in the measured physical quantity from a reference value; and a power-transmission control circuit that controls at least one of a frequency of a voltage output from the inverter circuit and an output-time rate of the voltage during power transmission, that records a control parameter regarding at least one of the frequency and the output-time rate to a memory, and that controls, when the power transmission is resumed after the determination circuit performs the determination processing, the inverter circuit by using the control parameter determined based on a result of the determination processing.

(21) A wireless power-transmission system according to another aspect of the present disclosure includes: a power-transmitting circuit that converts input DC energy into AC energy and outputs the AC energy; a first resonator that resonates at frequencies f0 and fr and that sends the AC energy output from the power-transmitting circuit; a second resonator that resonates at the frequency f0 and that receives at least part of the AC energy sent from the first resonator through electromagnetic coupling with the first resonator; a power-receiving circuit that converts the AC energy received by the second resonator into DC energy and supplies the converted DC energy to a load; and a third resonator that resonates at the frequency fr and that electromagnetically couples with the first resonator. The power-transmitting circuit includes: an inverter circuit that has a plurality of switches and that converts input DC energy into AC energy via switching of the plurality of switches and outputs the AC energy to the first resonator; and a power-transmission control circuit that controls the switching of the plurality of switches in the inverter circuit. The power-receiving circuit includes: an oscillator circuit that is connected to the third resonator and that can oscillate at at least one of a frequency f10 lower than the frequency fr and a frequency f20 higher than the frequency fr; a measurement circuit that measures a physical quantity that changes according to a voltage output from the oscillator circuit; and a determination circuit that instructs the power-transmission control circuit so as to transmit power at a frequency f21 higher than the frequency f0, when the oscillator circuit oscillates at the frequency f10 and an amount of change in the measured physical quantity from a reference value is larger than a pre-set threshold, and that instructs the power-transmission control circuit so as to transmit power at a frequency f11 lower than the frequency f0, when the oscillator circuit oscillates at the frequency f20 and the amount of change in the measured physical quantity from the reference value is larger than the pre-set threshold.

(22) A wireless power-transmission system according to another aspect of the present disclosure includes: a power-transmitting circuit that converts input DC energy into AC energy and outputs the AC energy; a first resonator that resonates at frequencies f0 and fr and that sends the AC energy output from the power-transmitting circuit; a second resonator that resonates at the frequency f0 and that receives at least part of the AC energy sent from the first resonator through electromagnetic coupling with the first resonator; a power-receiving circuit that converts the AC energy received by the second resonator into DC energy and supplies the converted DC energy to a load; and a third resonator that resonates at the frequency fr and that electromagnetically couples with the first resonator. The power-receiving circuit includes: a measurement circuit that measures a physical quantity that changes according to the voltage output from the oscillator circuit; and a determination circuit that determines the presence/absence of a foreign substance on the basis of an amount of change in the measured physical quantity from a reference value. The power-transmitting circuit includes: an inverter circuit that has a plurality of switches and that converts input DC energy into AC energy via switching of the plurality of switches and outputs the AC energy to the first resonator; an oscillator circuit that is connected to the third resonator and that outputs a voltage including an AC component; and a power-transmission control circuit that controls at least one of a frequency of a voltage output from the inverter circuit and an output-time rate of the voltage during power transmission, that records a control parameter regarding at least one of the frequency and the output-time rate to a memory, and that controls, when the power transmission is resumed after the determination circuit performs the determination processing, the inverter circuit by using the control parameter determined based on a result of the determination processing.

(23) A power receiving apparatus according to another aspect of the present disclosure includes: a second resonator that resonates at a frequency f0 and that receives at least part of AC energy sent from a first resonator, included in the power transmission apparatus, through electromagnetic coupling with the first resonator; a power-receiving circuit that converts the AC energy received by the second resonator into DC energy and supplies the converted DC energy to a load; and a third resonator that resonates at a frequency fr and that electromagnetically couples with the first resonator. The power-receiving circuit includes: an oscillator circuit that is connected to the third resonator and that can oscillate at at least one of a frequency f10 lower than the frequency fr and a frequency f20 higher than the frequency fr; a measurement circuit that measures a physical quantity that changes according to a voltage output from the oscillator circuit; and a determination circuit that instructs the power-transmission control circuit so as to transmit power at a frequency f21 higher than the frequency f0, when the oscillator circuit oscillates at the frequency f10 and an amount of change in the measured physical quantity from a reference value is larger than a pre-set threshold, and that instructs the power-transmission control circuit so as to transmit power at a frequency f11 lower than the frequency f0, when the oscillator circuit oscillates at the frequency f20 and the amount of change in the measured physical quantity from the reference value is larger than the pre-set threshold.

The wireless power-transmission system according to the present disclosure can be widely used in applications in which charging or power supply is performed. Examples of the applications include electric vehicles, audio-visual (AV) equipment, batteries, and medical equipment. According to the embodiments of the present disclosure, it is possible to avoid the risk of abnormal heat generation of metal that is present between a power-transmitting coil and a power-receiving coil. It is also possible to reduce an efficiency decline involved in the foreign-substance sensing processing.

What is claimed is:

1. A power transmission device that transmits first AC power in a noncontact manner to a first resonator of a power receiving device including a power receiving circuit, the first resonator receiving the first AC power, the power receiving circuit converting the first AC power received by the first resonator to first DC power and supplying the first DC power to a load, the power transmission device comprising:
    a memory that stores a requested voltage value of the first DC power supplied to the load;
    a receiving circuit that receives, from the power receiving device, an actual voltage value of the first DC power supplied to the load;
    an inverter that generates and transmits the first AC power to the first resonator via a second resonator;
    an oscillator that generates second AC power smaller than the first AC power and transmits the second AC power to the first resonator via a third resonator;
    a foreign substance detector that determines whether or not a foreign substance is present between the first resonator and the third resonator based on a physical quantity in the third resonator that changes according to the second AC power; and
    power transmission control circuitry operative to:
        set a foreign substance detection period in which foreign substance is detected by the foreign substance detector, between i) a first power transmission period in which the first AC power is transmitted from the second resonator to the first resonator and ii) a second power transmission period subsequent to the first power transmission period;
        set sequentially to the inverter, in the first power transmission period, frequencies i) from a frequency f1 of a power transmission voltage in an initial state ii) to a frequency f2 of the requested voltage value;
        cause the inverter to transmit the first AC power at each of the set frequencies;
        compare the requested voltage value with the actual voltage value of each of the frequencies, received by the receiving circuit;
        store a value indicating a frequency f0 of the actual voltage value in the memory if the actual voltage value equals to the requested voltage value;
        cause the inverter to transmit the first AC power at the frequency f0 if the actual voltage value equals to the requested voltage value;
        cause the inverter to stop the first AC power temporarily after the elapse of a predetermined period of time;
        cause the foreign substance detector to determine whether or not the foreign substance is present in the foreign substance detection period; and
        cause the inverter to resume a transmission of the first AC power in the second power transmission period by the value indicating the frequency f0 in the memory if it is determined that the foreign substance is not present within a predetermined period that starts from the stopping of the first AC power and that is regulated to cause the inverter to resume a transmission of the first AC power from the frequency f1.

2. The power transmission device according to claim 1, wherein the frequency f1 is higher than the frequency f2.

3. The power transmission device according to claim 1, wherein the frequency f1 is lower than the frequency f2.

4. The power transmission device according to claim 1, wherein, when it is determined that the foreign substance is not present after the predetermined period, the power transmission control circuitry resumes the transmission of the first AC power at the frequency f1 in the second power transmission period.

5. The power transmission device according to claim 1, wherein the predetermined period is 350 milliseconds specified in a Qi standard of a wireless power consortium (WPC).

6. The power transmission device according to claim 1, wherein the power transmission control circuitry is operative to:
    store: in the first power transmission period i) a value indicating a duty ratio of a voltage output from the inverter circuit and ii) the value indicating the frequency f0 in the memory;
cause the first AC power to be transmitted at the frequency f0; and
cause in the second power transmission period, the transmission of the first AC power to be resumed by using i) the value indicating the frequency f0, and ii) the value indicating the duty ratio in the memory.

7. The power transmission device according to claim 1, wherein the foreign substance detector measures the physical quantity in the third resonator that changes according to the second AC power, and determines that a foreign substance is present between the first resonator and the third resonator when a difference between the physical quantity after having changed and a prescribed reference value is greater than a preset threshold value.

8. The power transmission device according to claim 1, wherein the foreign substance detector measures the physical quantity in the third resonator, and determines whether or not a foreign substance is present based on a value calculated from the measured physical quantity.

9. The power transmission device according to claim 8, wherein the physical quantity in the third resonator is i) a voltage that is applied to the third resonator, ii) a current that flows in the third resonator, iii) a frequency that is applied to the third resonator, iv) an input impedance value of the third resonator, or v) an input inductance value of the third resonator.

10. The power transmission device according to claim 1, wherein the first resonator has a parallel resonant circuit including a coil and a capacitor, and
if the physical quantity in the third resonator is an input inductance of the third resonator,
the foreign substance detector is operative to:
measure i) an input inductance value Lin(f10) of the third resonator that is produced when the oscillator is oscillating at the frequency f10, and ii) an input inductance value Lin(f20) of the third resonator that is produced when the oscillator is oscillating at the frequency f20;
calculate a coupling coefficient k according to an expression $k^2=1-\text{Lin}(f20)/\text{Lin}(f10)$: and
determine whether or not the foreign substance is present based on the calculated coupling coefficient k.

11. The power transmission device according to claim 1, wherein the first resonator has a parallel resonant circuit including a coil and a capacitor, and
if the physical quantity in the third resonator is an input inductance value of the third resonator,
the foreign substance detector is operative to:
measure i) an input inductance value Lin(f10) of the third resonator that is produced when the oscillator is oscillating at the frequency f10, and ii) an input inductance value Lin(f20) of the third resonator that is produced when the oscillator is oscillating at the frequency f20;
calculate a ratio between the Lin(f10) and the Lin(f20); and
determine whether or not the foreign substance is present based on the calculated ratio.

12. The power transmission device according to claim 1, wherein the first resonator has a parallel resonance circuit including a coil and a capacitor,
the square of an oscillation frequency of the oscillator is inversely proportional to the input inductance value of the third resonator, when the oscillator is a self-exciting oscillator and when the physical quantity in the third resonator is an input inductance value of the third resonator, and
the foreign substance detector is operative to:
measure the frequency f10 and the frequency f20 at which the oscillator is oscillating;
calculate a coupling coefficient k according to an expression $k^2=1-f10^2/f20^2$; and
determine whether or not a foreign substance is present based on the calculated coupling coefficient k.

13. The power transmission device according to claim 1, wherein the first resonator and the third resonator are the same resonator, and
the power transmission device further comprises a switch that switches between i) a first electrical connection between the inverter and the same resonator, and ii) a second electrical connection between the oscillator and the same resonator, by the power transmission control circuitry,
wherein the power transmission control circuitry is operative to:
control the switch to switch from the first electrical connection to the second electrical connection when changing from the first power transmission period to the foreign substance detection period; and
control the switch to switch from the second electrical connection to the first electrical connection when changing from the foreign substance detection period to the second power transmission period.

14. A wireless power transmission system comprises:
a power receiving device having a first resonator and a power receiving circuit, the first resonator receiving a first AC power, the power receiving circuit converting the first AC power received by the first resonator to first DC power and supplying the first DC power to a load; and
a power transmission device that transmits first AC power in a noncontact manner to the power receiving device and that includes
a memory that stores a requested voltage value of the first DC power supplied to the load,
a receiving circuit that receives, from the power receiving device, an actual voltage value of the first DC power supplied to the load,
an inverter that generates the first AC power and transmits the first AC power to the first resonator via a second resonator,
an oscillator that generates second AC power smaller than the first AC power and transmits the second AC power to the first resonator via a third resonator,
a foreign substance detector that determines whether or not a foreign substance is present between the first resonator and the third resonator based on a physical quantity in the third resonator that changes according to the second AC power, and
a power transmission control circuitry operative to:
set a foreign substance detection period in which foreign substance is detected by the foreign substance detector, between i) a first power transmission period in which the first AC power is transmitted from the second resonator to the first resonator and ii) a second power transmission period subsequent to the first power transmission period;
set sequentially to the inverter, in the first power transmission period, frequencies (i) from a frequency f1 of a power transmission voltage in an initial state (ii) to a frequency f2 of the requested voltage value;

cause the inverter to transmit the first AC power at each of the set frequencies;

compare the requested voltage value with the actual voltage value of each of the frequencies, received by the receiving circuit;

store a value indicating a frequency f0 of the actual voltage value in the memory if the actual voltage value equals to the requested voltage value;

cause the inverter to transmit the first AC power at the frequency f0 if the actual voltage value equals to the requested voltage value;

cause the inverter to stop the first AC power temporarily after the elapse of a predetermined period of time;

cause the foreign substance detector to determine whether or not the foreign substance is present in the foreign substance detection period; and cause the inverter to resume a transmission of the first AC power in the second power transmission period by the value indicating the frequency f0 in the memory if it is determined that the foreign substance is not present within a predetermined period that starts from the stopping of the first AC power and that is regulated to cause the inverter to resume a transmission of the first AC power from the frequency f1.

* * * * *